United States Patent [19]

Shibayama et al.

[11] Patent Number: 5,715,097
[45] Date of Patent: Feb. 3, 1998

[54] ZOOM LENS

[75] Inventors: Atsushi Shibayama, Tokyo; Takanori Fujita; Masatoshi Suzuki, both of Tochigi-ken, all of Japan

[73] Assignee: Nikon Corporation, Tokyo, Japan

[21] Appl. No.: 652,794

[22] Filed: May 23, 1996

[30] Foreign Application Priority Data

Jun. 1, 1995 [JP] Japan ................... 7-158572

[51] Int. Cl.$^6$ .................... G02B 15/14; G02B 15/22
[52] U.S. Cl. ................ 359/691; 359/684; 359/689; 359/693
[58] Field of Search ................... 359/689, 691, 359/684, 693

[56] References Cited

U.S. PATENT DOCUMENTS

| | | | |
|---|---|---|---|
| 4,726,667 | 2/1988 | Tachihara | 359/684 |
| 5,276,553 | 1/1994 | Tatsuno | 359/686 |
| 5,563,739 | 10/1996 | Sato | 359/691 |
| 5,644,435 | 7/1997 | Shikama | 359/691 |

FOREIGN PATENT DOCUMENTS

| | | | |
|---|---|---|---|
| 548898-A1 | 6/1993 | European Pat. Off. | 359/691 |
| A-57-5012 | 1/1982 | Japan . | |
| 3-5714 | 1/1991 | Japan | 359/691 |

Primary Examiner—David C. Nelms
Assistant Examiner—Evelyn A. Lester
Attorney, Agent, or Firm—Oliff & Berridge, P.L.C.

[57] ABSTRACT

A zoom lens structured so that a substantially constant amount of movement of a focusing lens group is required for focusing on objects at the same distance regardless of the zoom position even when an inner focusing method is implemented. The zoom lens includes in order from an object side, a first lens group which has a negative refractive power and a second lens group which has a positive refractive power, wherein zooming is executed by changing a distance between the first lens group and the second lens group, wherein the second lens group includes, in order from the object side, a front group which has a positive refractive power and a rear group which has a positive refractive power, and wherein focusing from an object at a far distance to an object at a close distance is executed by moving the front group towards an image side.

18 Claims, 24 Drawing Sheets

FNO=4.06
d g
1.000
SPHERICAL ABERRATION

Y=21.60
g g
d d
1.000
ASTIGMATISM

Y=21.60
5.000 (%)
DISTORTION

FNO=5.62
d g
1.000
SPHERICAL

Y=21.60
g g
d d
1.000
ASTIGMATISM

Y=21.60
5.000 (%)
DISTORTION

FIG. 4a
NA=0.12

SPHERICAL ABERRATION 1.000

FIG. 4b
Y=21.60

ASTIGMATISM 1.000

FIG. 4c
Y=21.60

DISTORTION 5.000(%)

FIG. 5a
NA=0.09

SPHERICAL ABERRATION 1.000

FIG. 5b
Y=21.60

ASTIGMATISM 1.000

FIG. 5c
Y=21.60

DISTORTION 5.000(%)

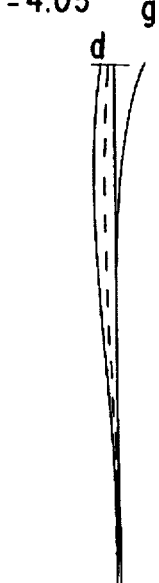
FIG. 7a  FIG. 7b  FIG. 7c
FIG. 8a  FIG. 8b  FIG. 8c

NA=0.12
SPHERICAL ABERRATION
1.000

Y=21.60
ASTIGMATISM
1.000

Y=21.60
DISTORTION
5.000 (%)

NA=0.09
SPHERICAL ABERRATION
1.000

Y=21.60
ASTIGMATISM
1.000

Y=21.60
DISTORTION
5.000 (%)

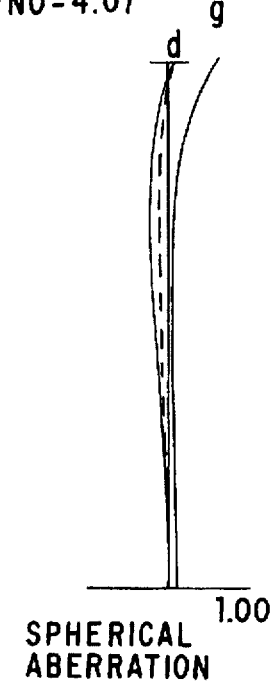
FIG. 12a  FIG. 12b  FIG. 12c
FNO=4.07     Y=21.60     Y=21.60
SPHERICAL ABERRATION 1.000    ASTIGMATISM 1.000    DISTORTION 5.000 (%)
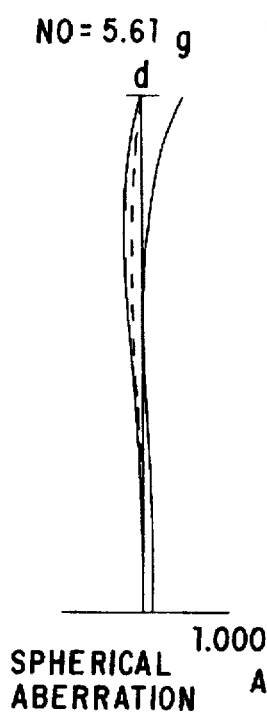
NO=5.61     Y=21.60     Y=21.60
SPHERICAL ABERRATION 1.000    ASTIGMATISM 1.000    DISTORTION 5.000 (%)
FIG. 13a  FIG. 13b  FIG. 13c

FIG. 14a
NA=0.12
g, d
SPHERICAL ABERRATION
1.000

FIG. 14b
Y=21.60
g g
d d
ASTIGMATISM
1.000

FIG. 14c
Y=21.60
DISTORTION
5.000 (%)

FIG. 15a
NA=0.09
g, d
SPHERICAL ABERRATION
1.000

FIG. 15b
Y=21.60
gg
dd
ASTIGMATISM
1.000

FIG. 15c
Y=21.60
DISTORTION
5.000 (%)

FIG. 17a
FNO=3.52
SPHERICAL ABERRATION  1.000
FIG. 17b
Y=21.60
ASTIGMATISM  1.000
FIG. 17c
Y=21.60
DISTORTION  5.000 (%)
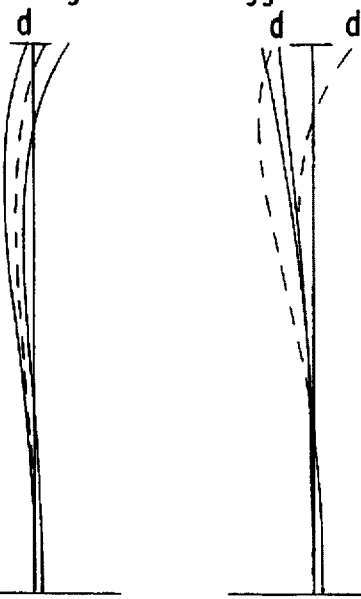
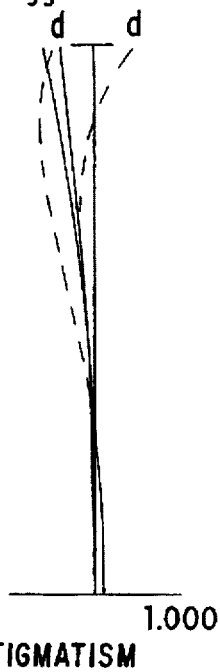
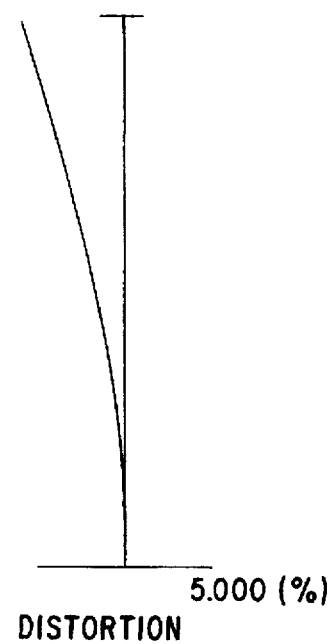
FIG. 18a
FNO=5.56
SPHERICAL ABERRATION  1.000
FIG. 18b
Y=21.60
ASTIGMATISM  1.000
FIG. 18c
Y=21.60
DISTORTION  5.000 (%)
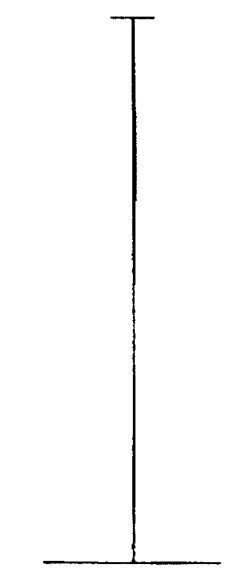

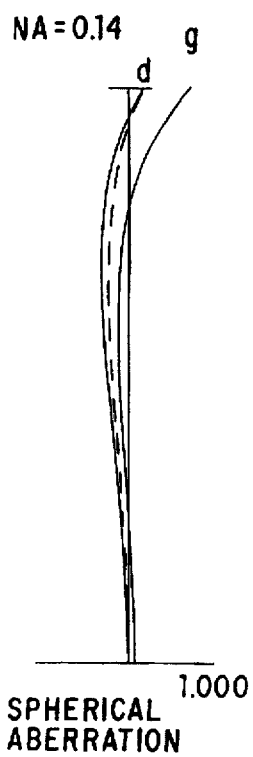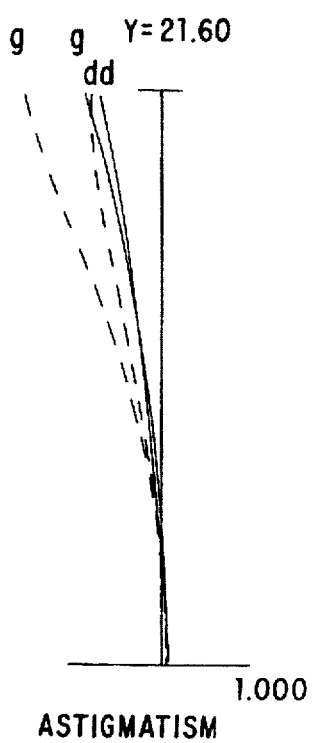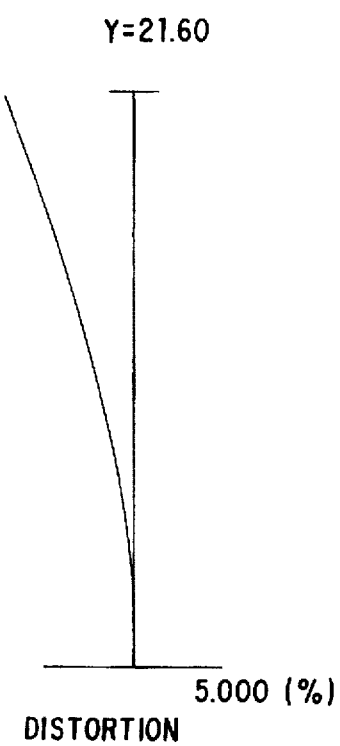
FIG. 19a  FIG. 19b  FIG. 19c
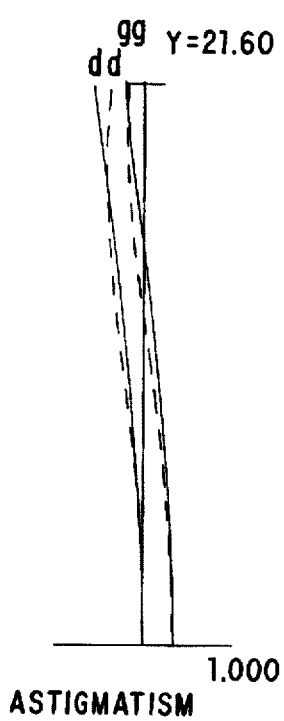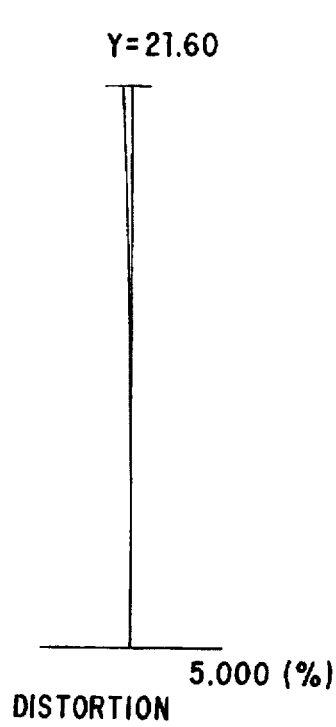
FIG. 20a  FIG. 20b  FIG. 20c

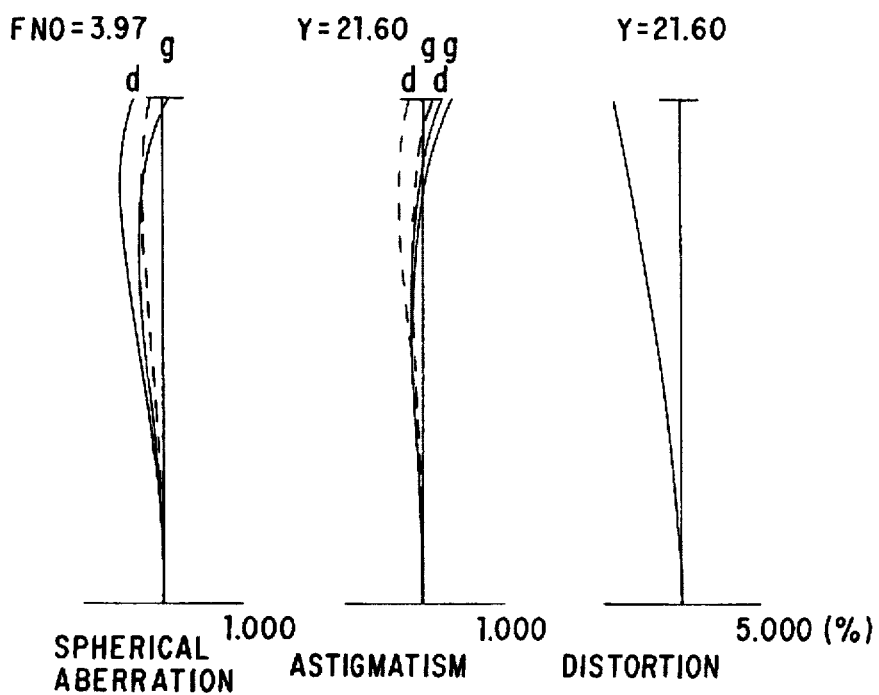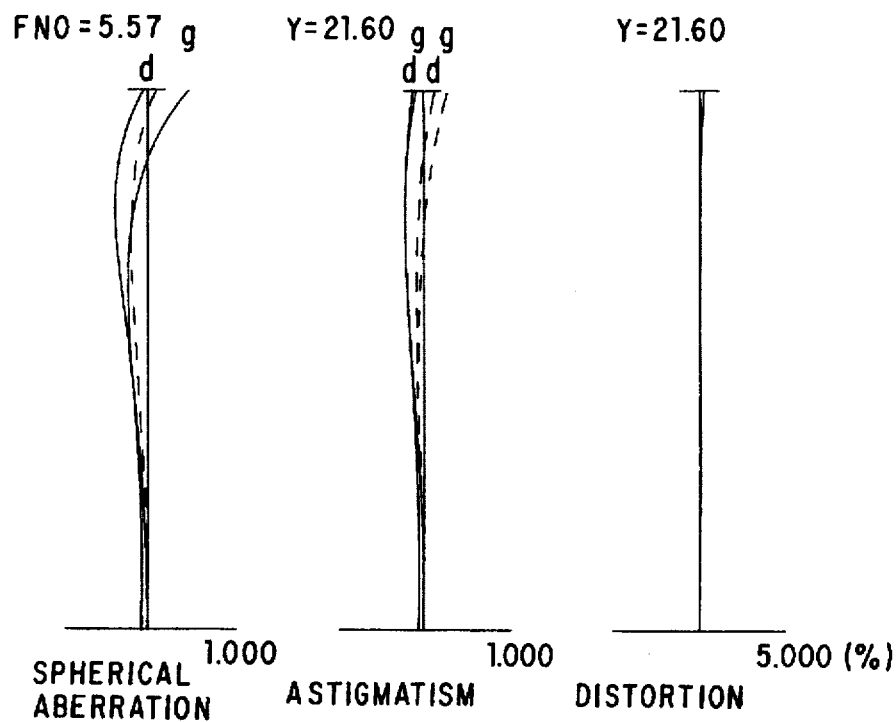

FIG. 24a
NA = 0.13
SPHERICAL ABERRATION
1.000
FIG. 24b
Y = 21.60
ASTIGMATISM
1.000
FIG. 24c
Y = 21.60
DISTORTION
5.000 (%)
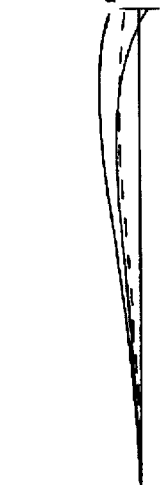
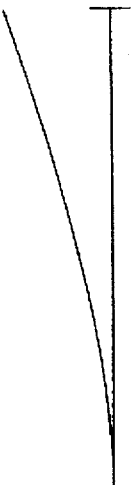
FIG. 25a
NA = 0.09
SPHERICAL ABERRATION
1.000
FIG. 25b
Y = 21.60
ASTIGMATISM
1.000
FIG. 25c
Y = 21.60
DISTORTION
5.000 (%)
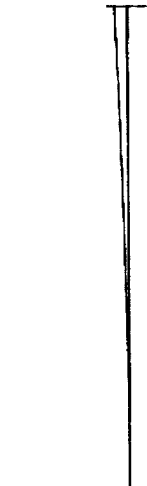

FIG. 27a
FNO=4.14
SPHERICAL ABERRATION   1.000
FIG. 27b
Y=21.60
ASTIGMATISM   1.000
FIG. 27c
Y=21.60
DISTORTION   5.000 (%)
FNO=5.57
SPHERICAL ABERRATION   1.000
Y=21.60
ASTIGMATISM   1.000
Y=21.60
DISTORTION   5.000 (%)
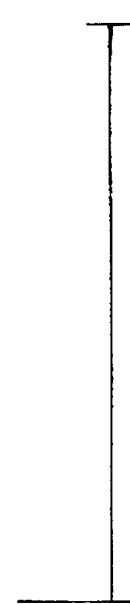
FIG. 28a   FIG. 28b   FIG. 28c

SPHERICAL ABERRATION 1.000
ASTIGMATISM 1.000
DISTORTION 5.000 (%)

SPHERICAL ABERRATION 1.000
ASTIGMATISM 1.000
DISTORTION 5.000 (%)

FNO=4.00

SPHERICAL ABERRATION 1.000

Y=21.60

ASTIGMATISM 1.000

Y=21.60

DISTORTION 5.000 (%)

FNO=5.92

SPHERICAL ABERRATION 1.000

Y=21.60

ASTIGMATISM 1.000

Y=21.60

DISTORTION 5.000 (%)

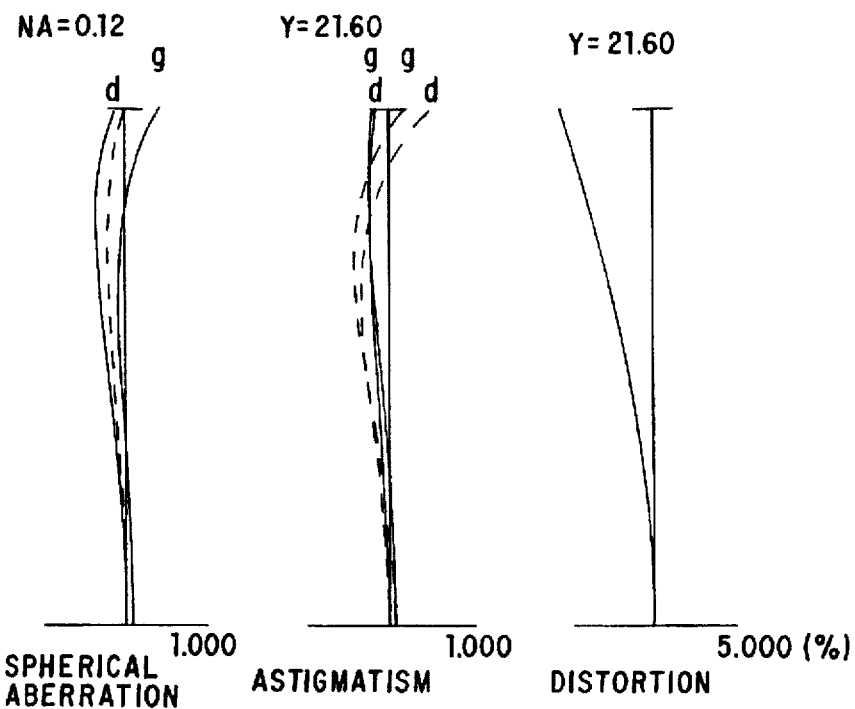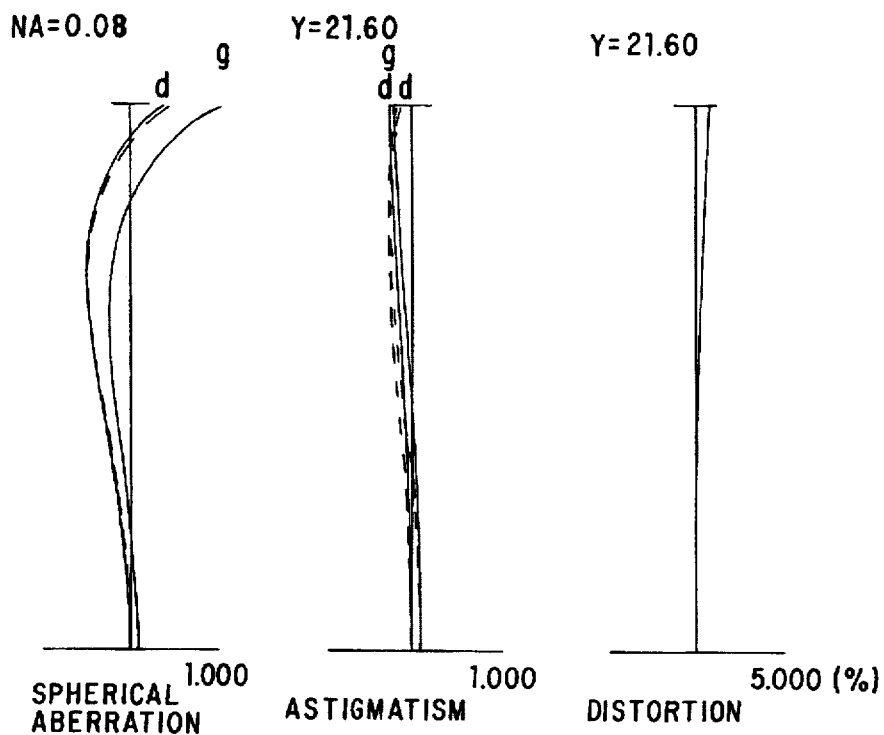

FIG. 37a
FNO=3.56
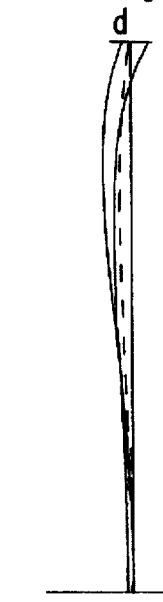
SPHERICAL ABERRATION 1.000
FIG. 37b
Y=21.60
ASTIGMATISM 1.000
FIG. 37c
Y=21.60
DISTORTION 5.000 (%)
FNO=4.98
SPHERICAL ABERRATION 1.000
Y=21.60
ASTIGMATISM 1.000
Y=21.60
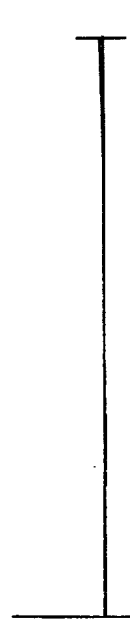
DISTORTION 5.000 (%)
FIG. 38a    FIG. 38b    FIG. 38c

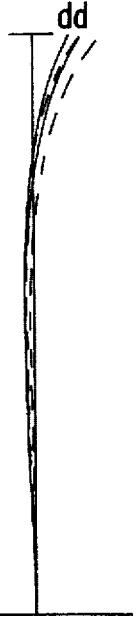
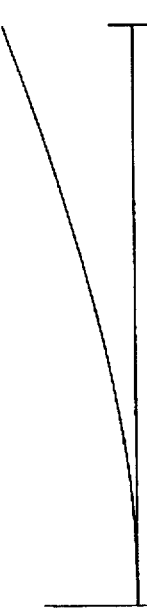
FIG. 39a — SPHERICAL ABERRATION (NA=0.14)
FIG. 39b — ASTIGMATISM (Y=21.60)
FIG. 39c — DISTORTION (Y=21.60)
FIG. 40a — SPHERICAL ABERRATION (NA=0.10)
FIG. 40b — ASTIGMATISM (Y=21.60)
FIG. 40c — DISTORTION (Y=21.60)

ZOOM LENS

BACKGROUND OF THE INVENTION

1. Field of the Invention

The invention relates to a zoom lens, more particularly, to a zoom lens suitable for an inner focusing method.

2. Description of Related Art

What is known as the first group focusing method wherein focusing is executed by moving a first lens group is commonly used as the focusing method of a zoom lens. The first group focusing method is used widely because it has the advantage that the amount of movement of the first lens group required for focusing on objects at the same distance does not depend on the zoom position (focal length).

A zoom lens is disclosed in Japanese Laid-Open Patent Publication No. 57-05012 that implements an inner focusing method or rear focusing method wherein focusing is executed by moving the lens groups positioned on the image side of the first lens group.

In the first group focusing method described above, focusing is executed by moving the relatively large and heavy first lens group. Hence, a focusing speed for auto focusing is inconveniently slower than a focusing speed of the inner focusing or rear focusing method.

On the other hand, in a zoom lens that uses the rear focusing method of Japanese Laid-Open Patent Publication No. 57-05012, the moving amount of the focusing lens group required for focusing on objects at the same distance varies drastically with zooming position. Hence, when zooming is executed after focusing on an object at close distance, inconveniently an out-of-focus condition occurs.

SUMMARY OF THE INVENTION

Considering the problems described above, it is an object of the invention to provide a zoom lens wherein the moving amount of the focusing lens group required for focusing on the object at the same distance remains nearly constant regardless of the zoom position even when an inner focusing method is implemented.

In order to solve the above-stated problem, the invention provides a zoom lens comprising, in order from the object side, a first lens group G1 which has a negative refractive power and a second lens group G2 which has a positive refractive power, wherein zooming is executed by changing the distance between the first lens group G1 and the second lens group G2, wherein the second lens group G2 comprises, in the order from the object side, the front group G2a which has a positive refractive power and the rear group G2b which has a positive refractive power, and wherein focusing from an object at far distance to an object at close distance is executed by moving the front group G2a towards the image side.

The invention also provides a zoom lens comprising, in order from the object side, a first lens group G1 which has a negative refractive power, a second lens group G2 which has a positive refractive power and a third lens group G3 which has a negative refractive power, wherein the distance between the first lens group G1 and the second lens group G2 decreases, and the distance between the second lens group G2 and the third lens group G3 changes during zooming from maximum wide-angle state to maximum telephoto state, or a zoom lens comprising, in order from the object side, a first lens group G1 which has a negative refractive power, a second lens group G2 which has a positive refractive power and a third lens group G3 which has a positive refractive power, wherein the distance between the first lens group G1 and the second lens group G2 decreases, and the distance between the second lens group G2 and the third lens group G3 changes during zooming from maximum wide-angle state to maximum telephoto state, wherein the second lens group G2 comprises, in order from the object side, the front group G2a which has a positive refractive power and the rear group G2b which has a positive refractive power, and wherein focusing from an object at far distance to an object at close distance is executed by moving the front group G2a towards the image side.

The zoom lens of the invention comprises, in order from the object side, at least the first lens group G1 which has a negative refractive power and the second lens group G2 which has a positive refractive power. The second lens group G2 comprises, in order from the object side, the front group G2a which has a positive refractive power and the rear group G2b which has a positive refractive power. Moreover, imaging magnification of the front group G2a is structured to assume large expansion magnification over the entire zoom region from the maximum wide-angle state to the maximum telephoto state.

In the structure described above, the focusing is executed by moving the front group G2a in the direction of the image plane. In this case, the amount $\Delta$ of the focusing amount which is the amount of movement associated with focusing of the front group G2a is obtained from the following approximation formula (a), $$\Delta = \{\beta^2/(\beta^2-1)\} \times \{f1^2/(D0-f1)\} \quad (a)$$

where, $\beta$ is the imaging magnification of the front group G2a, f1 is the focal length of the first lens group G1 and D0 is the distance from the object point to the object principle point of the first lens group G1.

On the right hand side of the formula (a), if an object distance is constant, f1 is a constant and D0 becomes constant in a zoom lens whose total length does not change during zooming. On the other hand $\beta$ varies with zooming, but if the zoom lens is structured such that the absolute value of $\beta$ is large, $\{\beta^2/(\beta^2-1)\}$ approaches 1, causing the fluctuation during zooming to become small.

Hence, it becomes necessary to make $|\beta|$ large in order to make the fluctuation due to zooming of the focusing amount $\Delta$ of the front group G2a. Moreover, it is desirable to make fluctuation of D0 during zooming small, that is to say, to make the movement amount of the first lens group G1 small during zooming.

Hereafter, each conditional formula of the present invention will be described.

In the invention, conditions $$|\beta 2at| > 2 \quad (1)$$

$$|\beta 2aw| > 2 \quad (2)$$

are preferably satisfied.

Here, $\beta 2at$ is imaging magnification of the front group G2a at the maximum telephoto state and $\beta 2aw$ is imaging magnification of the front group G2a at the maximum wide-angle state.

Conditional formulas (1) and (2) define the value of $|\beta|$ at the maximum telephoto state and the maximum wide-angle state respectively.

If the lower limit values of the conditional formulas (1) and (2) are not reached, the fluctuation of the focusing amount of the front group G2a due to zooming becomes undesirably too large.

The focusing amounts of the front group G2a at the maximum wide-angle state and at the maximum telephoto state may be made nearly equal by making the values of |β| at the maximum wide-angle state and the maximum telephoto state nearly equal to each other. In this case it is desirable to make the imaging magnification β2aw of the front group G2a at the maximum wide-angle state to be negative and to make the imaging magnification β2at of the front group G2a at the maximum telephoto state to be positive in order to perform zooming effectively. Hence, the conditional formulas (3) and (4) below may preferably be satisfied in the invention, $$\beta 2at > 2 \quad (3)$$

$$\beta 2aw < -2 \quad (4)$$

The conditional formulas (5) and (6) below may preferably be satisfied in the invention, $$f2b/e2bw > 0.8 \quad (5)$$

$$f2b/e2bt < 1.2 \quad (6)$$

Here, f2b is the focal length of the rear group G2b, e2bw is the distance from the image principal point of the rear group G2b to the image plane at the maximum wide-angle state and e2bt is the distance from the image principal point of the rear group G2b to the image plane at the maximum telephoto state.

The conditional formulas (5) and (6) define an appropriate range for the focal length of the rear group G2b for executing focusing with the front group G2a. If the lower limit value of the conditional fomula (5) is not reached or if the upper limit value of the conditional fomula (6) is exceeded, the fluctuation of the focusing amount of the front group G2a due to zooming becomes undesirably too large.

The conditional formula (7) below may preferably be satisfied in the invention, $$0.5 < f2a/f2b < 2 \quad (7)$$

where, f2a is the focal length of the front group G2a. The conditional formula (7) defines an appropriate range for the ratio of the focal length of the front group G2a to the focal length of the rear group G2b.

If the lower limit value of the conditional formula (7) is not reached, the refractive power of the front group G2a becomes undesirably too large for correction of spherical aberration. Conversely, if the upper limit of the conditional formula (7) is exceeded, it becomes difficult to secure back focus and to reduce the total length of the zoom lens.

The conditional formula (8) and (9) below may preferably be satisfied in the invention, $$f2a/(|f1|+e1t) > 0.8 \quad (8)$$

$$f2a/(|f1|+e1w) < 1.2 \quad (9)$$

where, e1t is the distance from the image principal point of the first lens group G1 to the object principal point of the front group G2a at the maximum telephoto state, and e1w is the distance from the image principal point of the first lens group G1 to the object principal point of the front group G2a at the maximum wide-angle state.

Conditional formulas (8) and (9) define an appropriate relationship between the focal length of the first lens group G1 and the focal length of the front group G2a when focusing is executed by the front group G2a. If the lower limit value of conditional formula (8) is not reached or the upper limit value of conditional formula (9) is exceeded, the fluctuation of the focusing amount of the front group G2a becomes undesirably too large.

As explained above, the foundation of the invention is the two groups zoom lens comprising the first lens group G1 which has a negative refractive power and the second lens group G2 which has a positive refractive power. However, a third lens group G3 which has either a positive refractive power or a negative refractive power may be added to the object side of the second lens group to make the aperture ratio larger or to make the system smaller. Moreover, when the third lens group G3 which has a negative refractive power is added, the first lens group G1 may be fixed during zooming by making the third lens group G3 to be a compensator.

If a diaphragm is arranged between the front group G2a and the rear group G2b, hardware structure becomes simple, resulting in an inexpensive system. Furthermore, correction of various off-axis aberrations including astigmatism may be performed more effectively.

By structuring the front group G2a which is the focusing lens group with one lens, a biconvex lens for example, the system may be made smaller and lighter, enabling increase in the speed of lens driving during auto focusing. Furthermore, by composing the front group G2a a cemented lens or a lens having aspherical surface, various aberrations may be corrected more effectively and the fluctuation of various aberrations may be reduced during focusing.

BRIEF DESCRIPTION OF THE DRAWINGS

FIGS. 4(a)–4(c) are graphs that show various aberrations in the object distance R=500 at the maximum wide-angle state in the first embodiment;

FIGS. 5(a)–5(c) are graphs that show various aberrations in the object distance R=500 at the maximum telephoto state in the first embodiment;

FIGS. 7(a)–7(c) are graphs that show various aberrations in the infinite distance focus state at the maximum wide-angle state in the second embodiment;

FIGS. 8(a)–8(c) are graphs that show various aberrations in the infinite distance focus state at maximum telephoto state in the second embodiment;

FIGS. 12(a)–12(c) are graphs that show various aberrations in the infinite distance focus state at the maximum wide-angle state in the third embodiment;

FIGS. 13(a)–13(c) are graphs that show various aberrations in the infinite distance focus state at maximum telephoto state in the third embodiment;

FIGS. 14(a)–14(c) are graphs that show various aberrations in the object distance R=500 at the maximum wide-angle state in the third embodiment;

FIGS. 15(a)–15(c) are graphs that show various aberrations in the object distance R=500 at maximum telephoto state in the third embodiment;

FIGS. 17(a)–17(c) are graphs that show various aberrations in the infinite distance focus state at the maximum wide-angle state in the fourth embodiment;

FIGS. 18(a)–18(c) are graphs that show various aberrations in the infinite distance focus state at maximum telephoto state in the fourth embodiment;

FIGS. 19(a)–19(c) are graphs that show various aberrations in the object distance R=500 at the maximum wide-angle state in the fourth embodiment;

FIGS. 20(a)–20(c) are graphs that show various aberrations in the object distance R=500 at maximum telephoto state in the fourth embodiment;

FIGS. 22(a)–22(c) are graphs that show various aberrations in the infinite distance focus state at the maximum wide-angle state in the fifth embodiment;

FIGS. 23(a)–23(c) are graphs that show various aberrations in the infinite distance focus state at maximum telephoto state in the fifth embodiment;

FIGS. 24(a)–24(c) are graphs that show various aberrations in the object distance R=500 at the maximum wide-angle state in the fifth embodiment;

FIGS. 25(a)–25(c) are graphs that show various aberrations in the object distance R=500 at maximum telephoto state in the fifth embodiment;

FIGS. 27(a)–27(c) are graphs that show various aberrations in the infinite distance focus state at the maximum wide-angle state in the sixth embodiment;

FIGS. 28(a)–28(c) are graphs that show various aberrations in the infinite distance focus state at maximum telephoto state in the sixth embodiment;

FIGS. 29(a)–29(c) are graphs that show various aberrations in the object distance R=500 at the maximum wide-angle state in the sixth embodiment;

FIGS. 30(a)–30(c) are graphs that show various aberrations in the object distance R=500 at maximum telephoto state in the sixth embodiment;

FIGS. 34(a)–34(c) are graphs that show various aberrations in the object distance R=500 at the maximum wide-angle state in the seventh embodiment;

FIGS. 35(a)–35(c) are graphs that show various aberrations in the object distance R=500 at maximum telephoto state in the seventh embodiment;

FIGS. 37(a)–37(c) are graphs that show various aberrations in the infinite distance focus state at the maximum wide-angle state in the eighth embodiment;

FIGS. 38(a)–38(c) are graphs that show various aberrations in the infinite distance focus state at maximum telephoto state in the eighth embodiment;

FIGS. 39(a)–39(c) are graphs that show various aberrations in the object distance R=500 at the maximum wide-angle state in the eighth embodiment;

FIGS. 40(a)–40(c) are graphs that show various aberrations in the object distance R=500 at maximum telephoto state in the eighth embodiment.

DETAILED DESCRIPTION OF PREFERRED EMBODIMENTS

Figure 1:
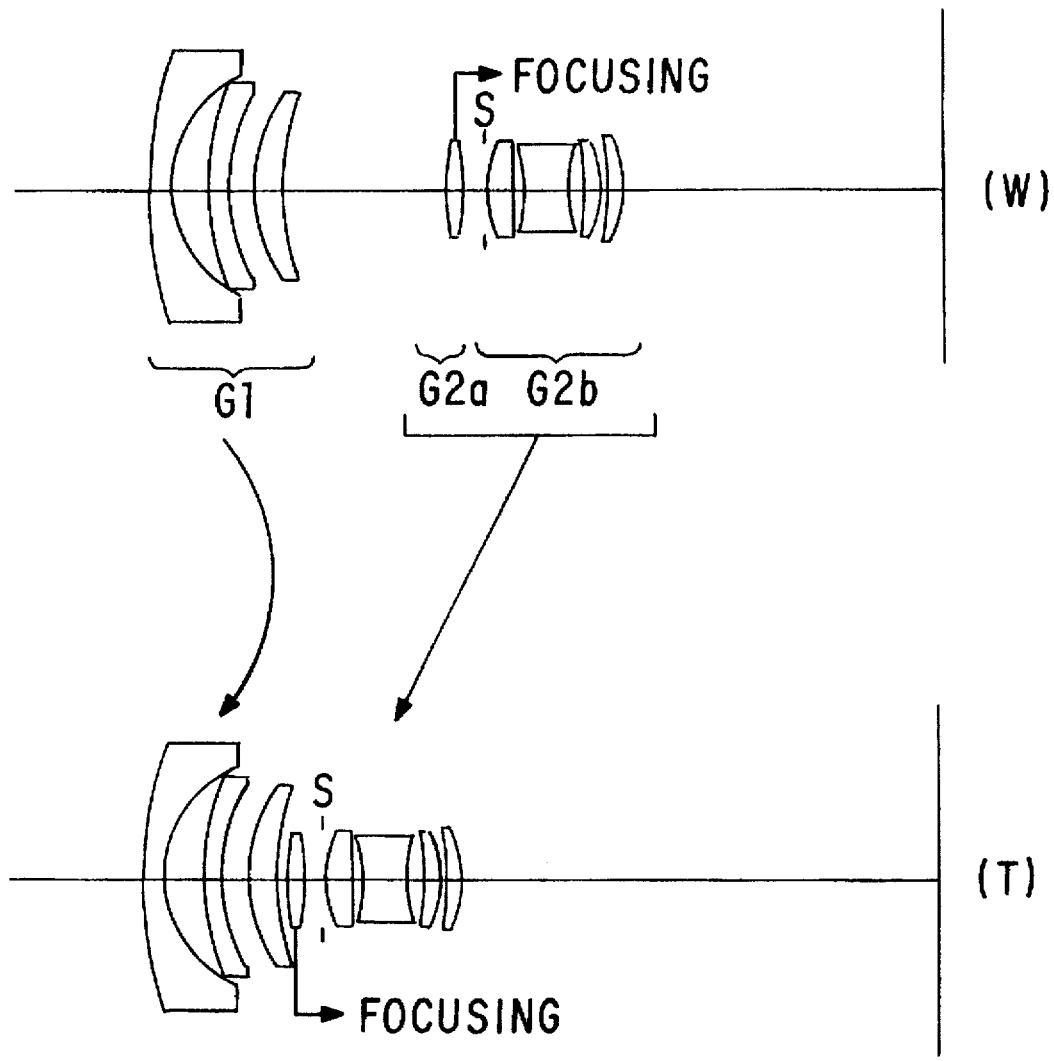
FIG. 1 is a schematic side view of the lens configuration and conditions of movement of each lens group from the maximum wide-angle state (W) to the maximum telephoto state (T) in a zoom lens according to a first embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Each embodiment of the invention comprises, in order from the object side, at least a first lens group G1 which has a negative refractive power and a second lens group G2 which has a positive refractive power, and the zooming is performed by changing the distance between the first lens group G1 and the second lens group G2. Moreover, the second lens group G2 comprises, in order from the object side, a front group G2a which has a positive refractive power and a rear group G2b which has a positive refractive power and focusing from an object at far distance to an object at close distance is performed by moving the front group G2a towards the image side.

The aspherical surfaces are expressed by the following formula (b) when the aspherical surfaces are described with y as the height in the direction perpendicular to the optical axis; S(y) as the displacement in the direction of the optical axis at height y; R as the reference radius of curvature, that is, the radius of curvature at the apex of the aspherical surface; κ as the conical coefficient; and Cn as the nth degree aspherical surface coefficient.

$$S(y)=(y^2/R)/[1+(1-\kappa \cdot y^2/R^2)^{1/2}]+C_2 \cdot y^2+C_4 \cdot y^4+C_6 \cdot y^6+C_8 \cdot y_8+C_{10} \cdot y^{10}+ \quad (b)$$

Moreover, the near-axis radius of curvature of aspherical surface r is defined by the formula (c) below.

$$r=1/(2 \cdot C_2+1/R) \quad (c)$$

The aspherical surfaces of each embodiment are marked with the symbol * to the right of the surface number.

FIG. 1 is a schematic side view of the lens structure of the zoom lens and the conditions associated with the movement of each lens group from the maximum wide-angle state (W) to the maximum telephoto state (T) of the first embodiment of the invention.

The zoom lens of FIG. 1 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a biconvex lens, and a rear group G2b which has a biconvex lens, a biconcave lens, a positive meniscus lens having the concave surface facing the object side and a positive meniscus lens having the concave surface facing the object side.

The diaphragm S is arranged between the front group G2a and the rear group G2b. Each lens group moves along the zoom locus on the optical axis indicated by the arrow in FIG. 1 during zooming from the maximum wide-angle state (W) to the maximum telephoto state (T). Furthermore, focusing from an object at a far distance to an object at a close distance is performed by moving the front group G2a towards the image side.

Next, values of various dimensions in the first embodiment of the invention are listed in Table (1). In Table (1), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line (λ=587.6 nm).

TABLE 1 f = 25.50–35.00–48.80
FNO = 4.06–4.69–5.61
2ω = 82.35–63.821–47.81°

| Surface Number | Radius of Curvature | Intersurface Distance | Abbe Number | Refractive Index |
|---|---|---|---|---|
| 1 | 66.9735 | 2.6507 | 55.6 | 1.69680 |
| 2* | 15.0529 | 5.8500 | | |
| 3 | 41.9348 | 2.3412 | 45.4 | 1.79668 |
| 4 | 26.3468 | 4.4493 | | |
| 5 | 24.9776 | 4.0233 | 25.5 | 1.73037 |
| 6 | 50.5858 | (d6 = variable) | | |
| 7 | 131.4301 | 2.1985 | 82.5 | 1.49782 |
| 8 | −42.6883 | (d8 = variable) | | |
| 9 | ∞ | 0.1000 | | (diaphragm S) |
| 10 | 19.3105 | 4.0693 | 45.9 | 1.54813 |

TABLE 1-continued

| 11 | −56.2649 | 0.9000 | | |
| 12 | −27.2090 | 7.2000 | 31.6 | 1.75692 |
| 13 | 25.3419 | 1.7500 | | |
| 14 | −62.4093 | 2.7159 | 67.9 | 1.59318 |
| 15 | −18.0725 | 0.7000 | | |
| 16 | −49.1938 | 2.0333 | 82.5 | 1.49782 |
| 17 | −26.6507 | Bf | | |

Aspherical Surface Data:

| Surface 2: | κ | $C_2$ | $C_4$ |
|---|---|---|---|
| | 0.5443 | 0.0000 | $-7.38090 \times 10^{-10}$ |
| | $C_6$ | $C_8$ | $C_{10}$ |
| | $3.59980 \times 10^{-14}$ | $-4.76970 \times 10^{-12}$ | $1.85000 \times 10^{-14}$ |

Variable Distance During Zooming or Focusing Conditions:

| f | 25.50 | 35.00 | 48.80 |
|---|---|---|---|
| R | ∞ | ∞ | ∞ |
| d6 | 24.20021 | 10.94129 | 0.87697 |
| d8 | 3.35776 | 3.35776 | 3.35776 |
| Bf | 46.65558 | 56.04545 | 69.68549 |
| f | 25.50 | 35.00 | 48.80 |
| R | 500.00 | 500.00 | 500.00 |
| d6 | 27.29299 | 13.91210 | 3.97297 |
| d8 | 0.26499 | 0.38696 | 0.26176 |
| Bf | 46.65558 | 56.04545 | 69.68549 |

Condition Corresponding Values:

(1) |β2at| = 5.479
(2) |β2aw| = 5.672
(3) β2at = 5.479
(4) β2aw = −5.672
(5) f2b / e2bw = 1.145
(6) f2b / e2bt = 0.799
(7) f2a / f2b = 1.066
(8) f2a/ (|f1| + e1t) = 1.223
(9) f2a/ (|f1| + e1w) = 0.850

Figure 2A:
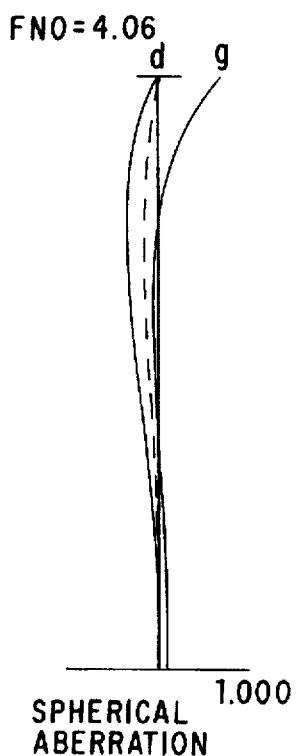
FIGS. 2(a)–2(c) are graphs that show various aberrations in the infinite distance focus state at the maximum wide-angle state in the first embodiment.
Figure 2B:
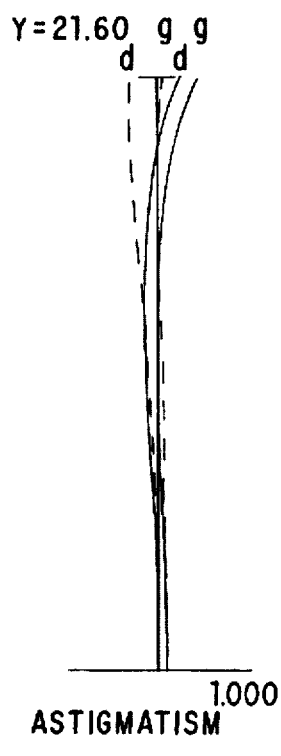
Figure 2C:
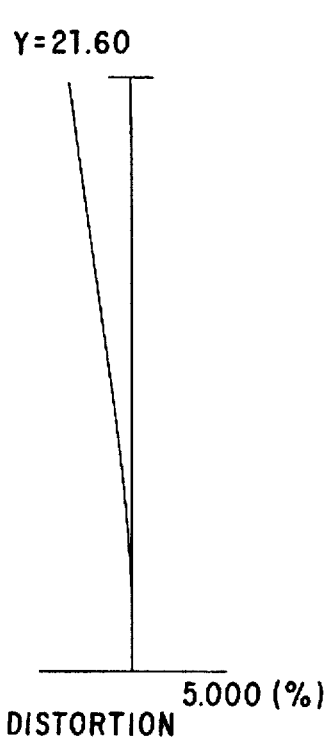
Figure 3A:
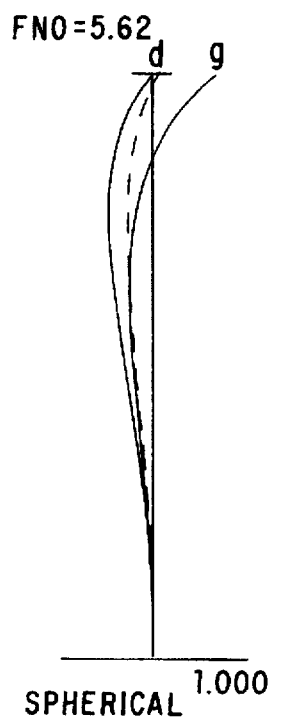
FIGS. 3(a)–3(c) are graphs that show various aberrations in the infinite distance focus state at the maximum telephoto state in the first embodiment.
Figure 3B:
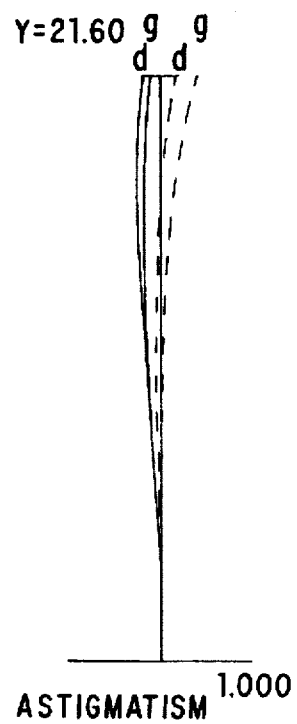
Figure 3C:
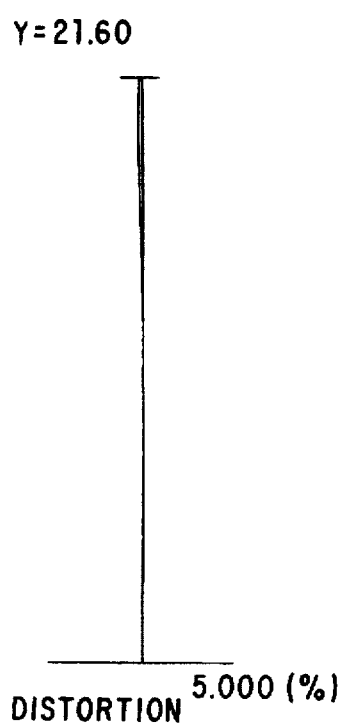

FIGS. 2(a) through 5(c) are graphs that show various aberrations of the first embodiment. FIGS. 2(a)–2(c) are graphs that show various aberrations at infinite focus state of the maximum wide-angle state. FIGS. 3(a)–3(c) are graphs that show various aberrations at infinite focus state of the maximum telephoto state. FIGS. 4(a)–4(c) are graphs that show various aberrations at the object distance of R=500 at maximum wide-angle state. FIGS. 5(a)–5(c) are graphs that show various aberrations at the object distance R=500 at the maximum telephoto state.

In each aberration graph, FNO denotes F-number, NA denotes numerical apertures, Y denotes the image height, d denotes the d-line (λ=587.6 nm), and g denotes the g-line (λ=435.8 nm). In the aberration graph showing the astigmatism the solid line represent sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the first embodiment.

Figure 6:
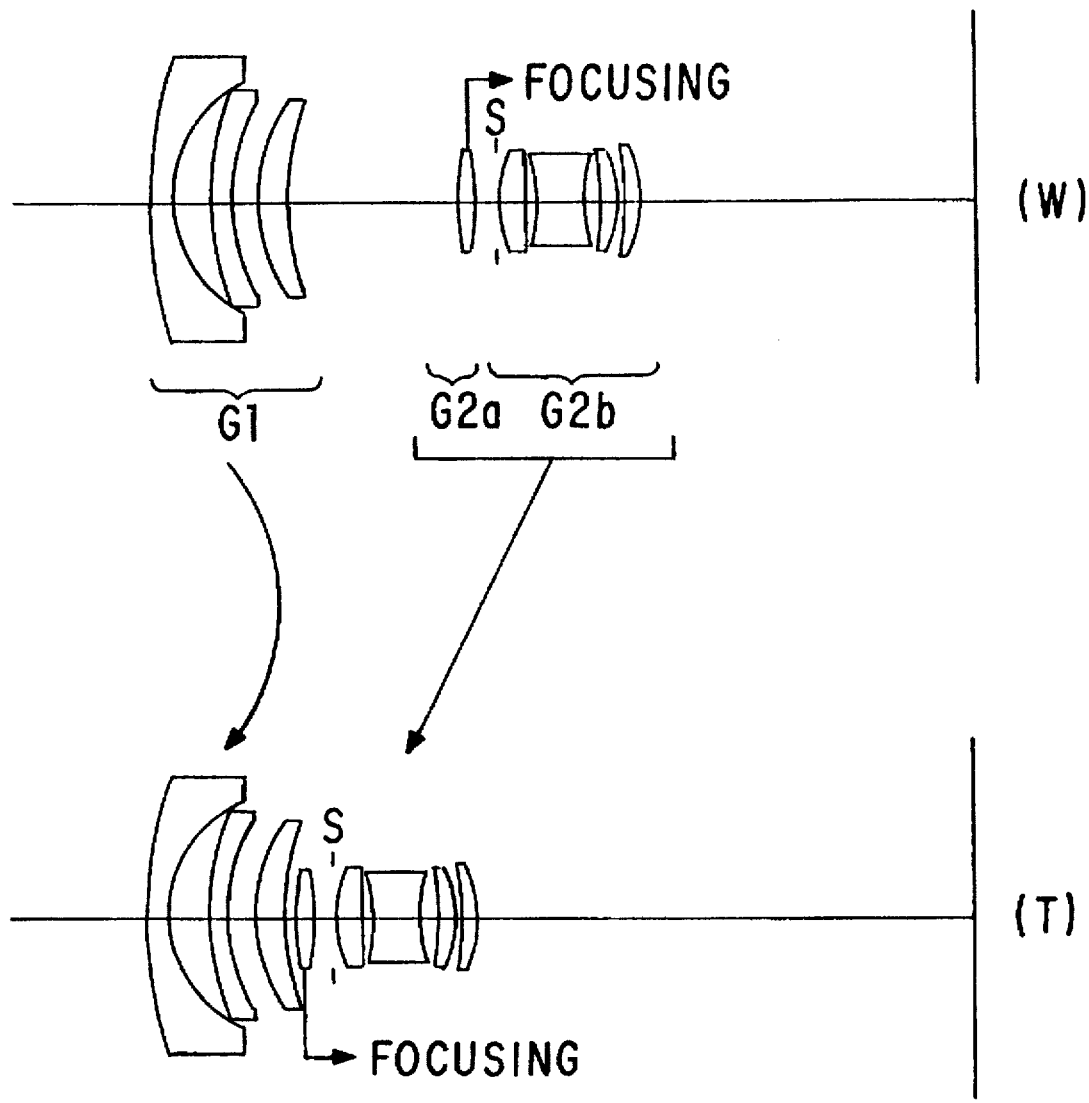
FIG. 6 is a schematic side view of the lens configuration and conditions of movement of each lens group from the maximum wide-angle state (W) to the maximum telephoto state (T) in a zoom lens according to a second embodiment of the invention.
Figure 9A:
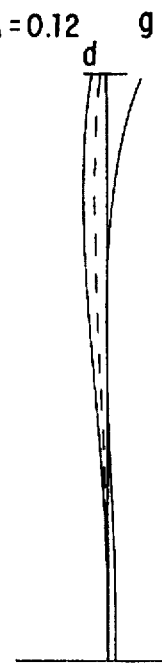
FIGS. 9(a)–9(c) are graphs that show various aberrations in the object distance R=500 at the maximum wide-angle state in the second embodiment.
Figure 9B:
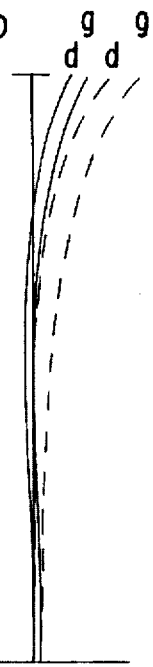
Figure 9C:

FIG. 6 is a schematic side view of the lens structure of the zoom lens and the conditions associated with the movement of each lens group from the maximum wide-angle state (W) to the maximum telephoto state (T) of the second embodiment of the invention.

The zoom lens of FIG. 6 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a biconvex lens, and a rear group G2b which has a biconvex lens, a biconcave lens, a positive meniscus lens having the concave surface facing the object side and a positive meniscus lens having the concave surface facing the object side.

The diaphragm S is arranged between the front group G2a and the rear group G2b. Each lens group moves along the zoom locus on the optical axis indicated by the arrow in FIG. 6 during zooming from the maximum wide-angle state (W) to the maximum telephoto state (T). Furthermore, focusing from an object at a far distance to an object at a close distance is performed by moving the front group G2a towards the image side.

Next, values of various dimensions in the second embodiment of the invention are listed in Table (2). In Table (2), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line ($\lambda=587.6$ nm).

TABLE 2 f = 25.50–35.00–48.80
FNO = 4.06–4.69–5.60
2ω = 82.41–63.66–47.66°

| Surface Number | Radius of Curvature | Intersurface Distance | Abbe Number | Refractive Index |
|---|---|---|---|---|
| 1 | 71.0328 | 2.6507 | 53.8 | 1.69350 |
| 2* | 15.2512 | 5.8500 | | |
| 3 | 39.9917 | 2.3412 | 45.4 | 1.79668 |
| 4 | 25.5024 | 4.4493 | | |
| 5 | 25.1339 | 4.0233 | 25.5 | 1.73037 |
| 6 | 51.1596 | (d6 = variable) | | |
| 7 | 222.6881 | 2.1985 | 82.5 | 1.49782 |
| 8* | −37.7354 | (d8 = variable) | | |
| 9 | ∞ | 0.1000 | | (diaphragm S) |
| 10 | 19.7647 | 5.0000 | 45.9 | 1.54813 |
| 11 | −44.7509 | 0.9000 | | |
| 12 | −26.3070 | 7.2000 | 31.6 | 1.75692 |
| 13 | 24.8929 | 1.7500 | | |
| 14 | −61.2128 | 2.7159 | 67.9 | 1.59318 |
| 15 | −21.3699 | 0.7000 | | |
| 16 | −42.1064 | 2.0333 | 82.5 | 1.49782 |
| 17 | −19.9963 | Bf | | |

Aspherical Surface Data:

Surface 2:
κ = 0.5443
$C_2$ = 0.0000
$C_4$ = $-7.38090 \times 10^{-10}$
$C_6$ = $3.59980 \times 10^{-14}$
$C_8$ = $-4.76970 \times 10^{-12}$
$C_{10}$ = $1.85000 \times 10^{-14}$ Surface 8:
κ = 0.1933
$C_2$ = 0.0000
$C_4$ = $-7.47500 \times 10^{-17}$
$C_6$ = $9.15430 \times 10^{-9}$
$C_8$ = $-5.23790 \times 10^{-16}$
$C_{10}$ = $-2.26540 \times 10^{-12}$ Variable Distance During Zooming Or Focusing Conditions:

| f | 25.50 | 35.00 | 48.80 |
|---|---|---|---|
| R | ∞ | ∞ | ∞ |
| d6 | 24.08972 | 10.83080 | 0.76648 |
| d8 | 3.35689 | 3.35689 | 3.35689 |
| Bf | 45.70261 | 55.09248 | 68.73252 |
| f | 25.50 | 35.00 | 48.80 |
| R | 500.00 | 500.00 | 500.00 |
| d6 | 27.18136 | 13.80052 | 3.86134 |
| d8 | 0.26526 | 0.38717 | 0.26203 |
| Bf | 45.70261 | 55.09248 | 68.73252 |

TABLE 2-continued

Condition Corresponding Values:

(1) |β2at| = 5.479
(2) |β2aw| = 5.672
(3) β2at = 5.479
(4) β2aw = −5.672
(5) f2b / e2bw = 1.145
(6) f2b / e2bt = 0.799
(7) f2a / f2b = 1.066
(8) f2a/ (|f1| + e1t) = 1.223
(9) f2a/ (|f1| + e1w) = 0.850

Figure 10A:
FIGS. 10(a)–10(c) are graphs that show various aberrations in the object distance R=500 at maximum telephoto state in the second embodiment.
Figure 10B:
Figure 10C:
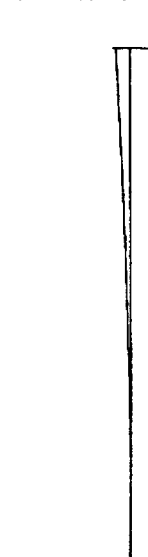

FIGS. 7(a) through 10(c) are graphs that show various aberrations of the second embodiment. FIGS. 7(a)–7(c) are graphs that show various aberrations at the infinite focus state of the maximum wide-angle state. FIG. 8(a)–8(c) are graphs that show various aberrations at the infinite focus state of the maximum telephoto state. FIGS. 9(a)–9(c) are graphs that show various aberrations at the object distance of R=500 at the maximum wide-angle state. FIGS. 10(a)–10(c) are graphs that show various aberrations at the object distance R=500 at the maximum telephoto state.

In each aberration graph, FNO denotes F-number, NA denotes numerical apertures, Y denotes the image height, d denotes the d-line ($\lambda=587.6$ nm), and g denotes the g-line ($\lambda=435.8$ nm). In the aberration graph showing the astigmatism the solid line represents the sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the second embodiment.

Figure 11:
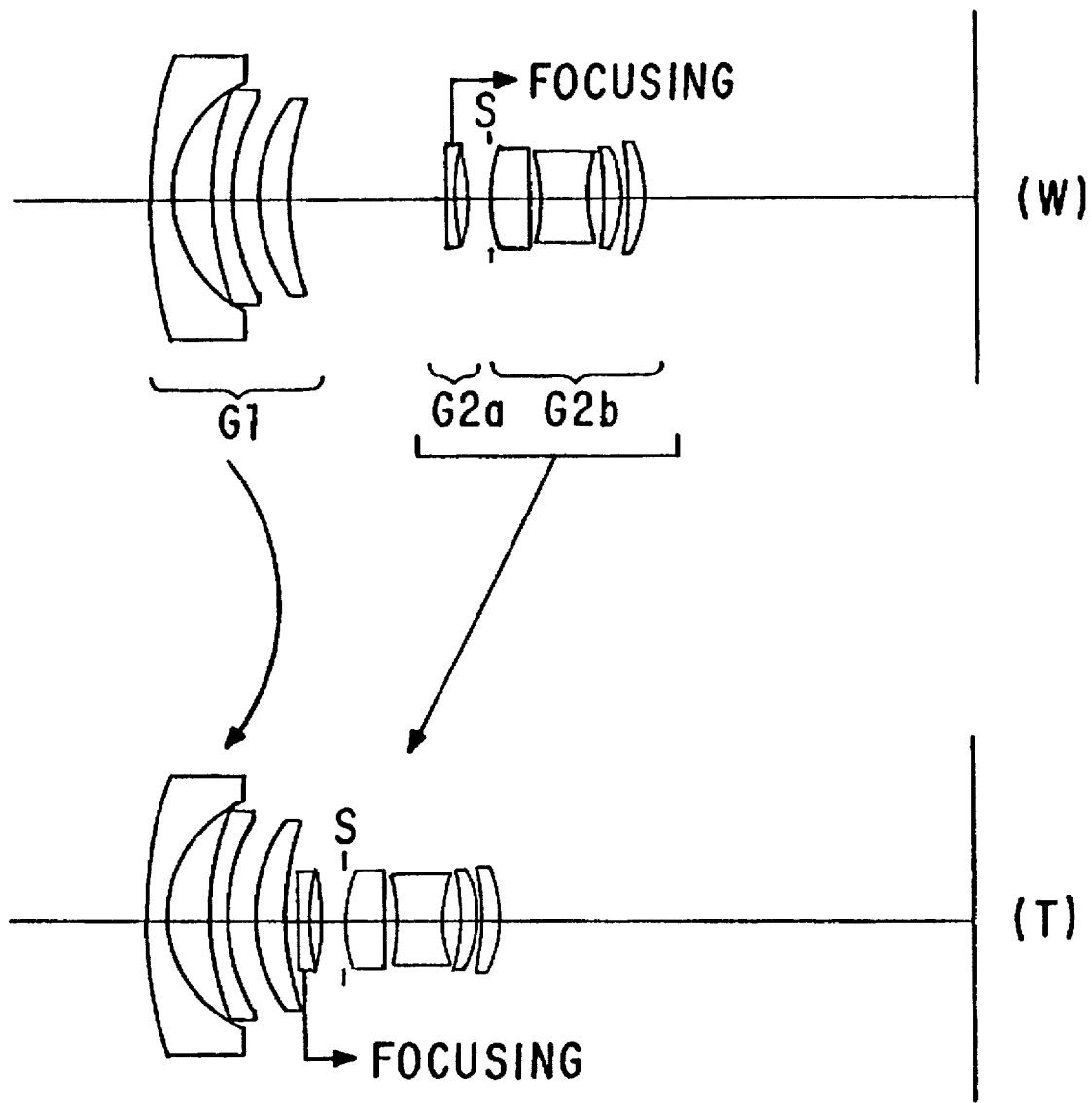
FIG. 11 is a schematic side view of the lens configuration and conditions of movement of each lens group from the maximum wide-angle state (W) to the maximum telephoto state (T) in a zoom lens according to a third embodiment of the invention.

FIG. 11 is schematic side view of the lens structure of the zoom lens and the conditions associated with movement of each lens group from the maximum wide-angle state (W) to the maximum telephoto state (T) of the third embodiment of the invention.

The zoom lens of FIG. 11 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a cemented positive lens with a negative meniscus lens having a convex surface facing the object side and a biconvex lens, and a rear group G2b which has a biconvex lens, a biconcave lens, a positive meniscus lens having the concave surface facing the object side and a positive meniscus lens having the concave surface facing the object side.

The diaphragm S is arranged between the front group G2a and the rear group G2b. Each lens group moves along the zoom locus on the optical axis indicated by the arrow in FIG. 11 during zooming from the maximum wide-angle state (W) to the maximum telephoto state (T). Furthermore, focusing from an object at a far distance to an object at a close distance is performed by moving the front group G2a towards the image side.

Next, values of various dimensions in the third embodiment of the invention are listed in Table (3). In Table (3), f denotes the focal length, FNO denotes the F-number, 2ω denotes the field angle, R denotes the object distance, and Bf denotes the back focus. The surface number is the order of the lens surface from the object side along the direction of the advancement of the light ray, and the values of refraction index and the Abbe number are relative to the d-line ($\lambda$=587.6 nm).

TABLE 3 f = 25.50–35.00–48.80
FNO = 4.06–4.69–5.61
2ω = 82.46–63.62–47.62°

| Surface Number | Radius of Curvature | Intersurface Distance | Abbe Number | Refractive Index |
|---|---|---|---|---|
| 1 | 69.7006 | 2.6507 | 53.8 | 1.69350 |
| 2* | 15.5924 | 5.8500 | | |
| 3 | 38.6054 | 2.3412 | 40.9 | 1.79631 |
| 4 | 22.9736 | 4.4493 | | |
| 5 | 24.0781 | 4.0233 | 25.5 | 1.73037 |
| 6 | 51.4787 | (d6 = variable) | | |
| 7 | 122.0187 | 1.0000 | 47.5 | 1.78797 |
| 8 | 42.4317 | 1.7000 | 67.9 | 1.59318 |
| 9 | –43.6905 | (d9 = variable) | | |
| 10 | ∞ | 0.1000 | | (diaphragm S) |
| 11 | 20.5921 | 5.5000 | 45.9 | 1.54813 |
| 12 | –57.9038 | 1.2000 | | |
| 13 | –26.3136 | 7.2000 | 31.6 | 1.75692 |
| 14 | 26.8800 | 1.7500 | | |
| 15 | –89.8671 | 2.7159 | 67.9 | 1.59318 |
| 16 | –18.0462 | 0.7000 | | |
| 17 | –49.3392 | 2.0333 | 82.52 | 1.49782 |
| 18 | –29.2451 | Bf | | |

Aspherical Surface Data:

| Surface 2: | κ | $C_2$ | $C_4$ |
|---|---|---|---|
| | 0.5443 | 0.0000 | $-7.38090 \times 10^{-10}$ |
| | $C_6$ | $C_8$ | $C_{10}$ |
| | $3.59980 \times 10^{-14}$ | $-4.76970 \times 10^{-12}$ | $1.85000 \times 10^{-14}$ |

Variable Distance During Zooming Or Focusing Conditions:

| f | 25.50 | 35.00 | 48.80 |
|---|---|---|---|
| R | ∞ | ∞ | ∞ |
| d6 | 24.10513 | 10.84621 | 0.78189 |
| d9 | 3.25788 | 3.25788 | 3.25788 |
| Bf | 45.02332 | 54.41320 | 68.05323 |
| f | 25.50 | 35.00 | 48.80 |
| R | 500.00 | 500.00 | 500.00 |
| d6 | 27.20011 | 13.81912 | 3.88010 |
| d9 | 0.16290 | 0.28497 | 0.15967 |
| Bf | 45.02332 | 54.41320 | 68.05323 |

Condition Corresponding Values:

(1) |β2at| = 5.479
(2) |β2aw| = 5.672
(3) β2at = 5.479
(4) β2aw = –5.672
(5) f2b / e2bw = 1.145
(6) f2b / e2bt = 0.799
(7) f2a / f2b = 1.066
(8) f2a/ (|f1| + e1t) = 1.223
(9) f2a/ (|f1| + e1w) = 0.850

FIGS. 12(a) through 15(c) are graphs that show various aberrations of the third embodiment. FIGS. 12(a)–12(c) are graphs that show various aberrations at the infinite focus state of the maximum wide-angle state. FIGS. 13(a)–13(c) are graphs that show various aberrations at the infinite focus state of the maximum telephoto state. FIGS. 14(a)–14(c) are graphs that show various aberrations at the object distance of R=500 at the maximum wide-angle state. FIGS. 5(a)–15(c) are graphs that show various aberrations at the object distance R=500 at the maximum telephoto state.

In each aberration graph, FNO denotes F-number, NA denotes numerical apertures, Y denotes the image height, d denotes the d-line ($\lambda$=587.6 nm), and g denotes the g-line ($\lambda$=435.8 nm). In the aberration graph showing the astigmatism the solid line represents the sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the third embodiment.

Figure 16:
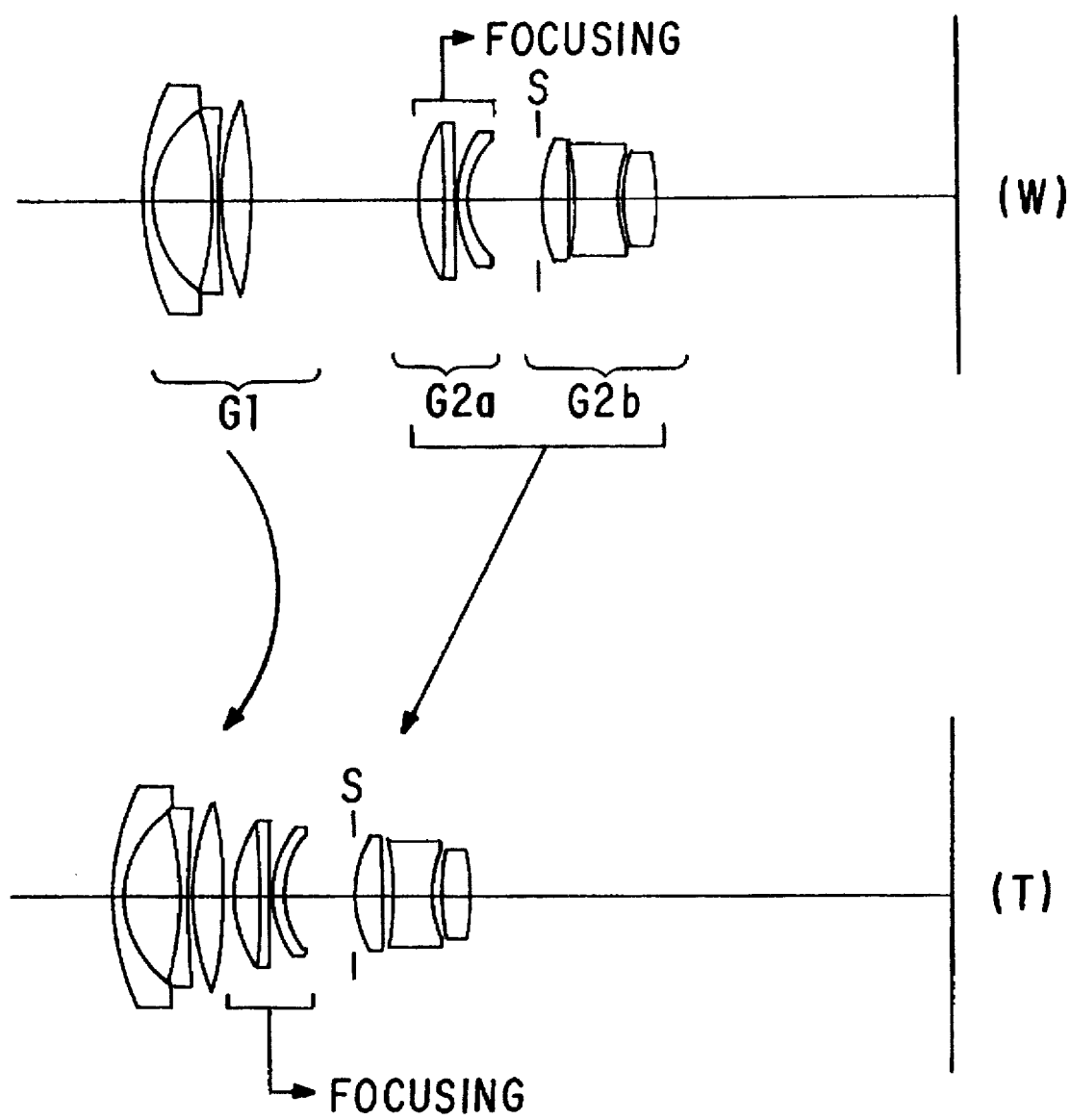
FIG. 16 is a schematic side view of the lens configuration and conditions of movement of each lens group from the maximum wide-angle state (W) to the maximum telephoto state (T) in a zoom lens according to a fourth embodiment of the invention.

FIG. 16 is a schematic side view of the lens structure of the zoom lens and the conditions associated with the movement of each lens group from the maximum wide-angle state (W) to the maximum telephoto state (T) of the fourth embodiment of the invention.

The zoom lens of FIG. 16 comprises, in order from the object side, a first lens group G1 which has a negative meniscus lens having a convex surface facing the object side, a biconcave lens, and a biconvex lens, a front group G2a which has a cemented positive lens with a biconvex lens, a biconcave lens, and a negative meniscus lens having a convex surface facing the object side, and a rear group G2b which has a biconvex lens, a biconcave lens and a biconvex lens.

The diaphragm S is arranged between the front group G2a and the rear group G2b. Each lens group moves along the zoom locus on the optical axis indicated by the arrow in FIG. 16 during zooming from the maximum wide-angle state (W) to the maximum telephoto state (T). Furthermore, focusing from an object at a far distance to an object at a close distance is performed by moving the front group G2a towards the image side.

Next, values of various dimensions in the fourth embodiment of the invention are listed in Table (4). In Table (4), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line ($\lambda$=587.6 nm).

TABLE 4 f = 36.00–50.00–68.00
FNO = 3.50–4.37–5.55
2ω = 65.03–47.42–35.28°

| Surface Number | Radius of Curvature | Intersurface Distance | Abbe Number | Refractive Index |
|---|---|---|---|---|
| 1 | 39.6060 | 1.5000 | 55.6 | 1.69680 |
| 2 | 16.3986 | 8.3000 | | |
| 3 | –44.2941 | 1.1000 | 49.5 | 1.74442 |
| 4 | 83.7864 | 0.5000 | | |
| 5 | 34.7491 | 4.6000 | 35.7 | 1.62588 |
| 6 | –76.8711 | (d6 = variable) | | |
| 7 | 20.7417 | 4.0000 | 61.1 | 1.58913 |
| 8 | –80.0000 | 1.0000 | 30.0 | 1.69895 |
| 9 | 146.6641 | 1.0000 | | |
| 10 | 16.3777 | 1.0000 | 35.2 | 1.74950 |
| 11 | 13.1694 | (d11 = variable) | | |
| 12 | ∞ | 0.5000 | | (diaphragm S) |
| 13 | 19.8116 | 4.0000 | 38.8 | 1.67162 |
| 14 | –188.9723 | 1.0000 | | |
| 15 | –58.2579 | 6.0000 | 29.5 | 1.71736 |
| 16 | 17.9096 | 1.0000 | | |
| 17 | 34.2637 | 4.5000 | 40.3 | 1.60717 |
| 18 | –84.7448 | Bf | | |

Variable Interval During Zooming Upon Focusing Conditions:

| f | 36.00 | 50.00 | 68.00 |
|---|---|---|---|
| R | ∞ | ∞ | ∞ |
| d6 | 24.11482 | 10.36082 | 0.99892 |
| d11 | 10.50522 | 10.50522 | 10.50522 |

TABLE 4-continued

| Bf  | 43.86206 | 55.56206 | 70.60484 |
|-----|----------|----------|----------|
| f   | 36.00    | 50.00    | 68.00    |
| R   | 500.00   | 500.00   | 500.00   |
| d6  | 29.25236 | 15.30045 | 6.13419  |
| d11 | 5.36768  | 5.56558  | 5.36994  |
| Bf  | 43.86206 | 55.56206 | 70.60484 |

Condition Corresponding Values:

(1) |β2at| = 6.210
(2) |β2aw| = 5.436
(3) β2at = 6.210
(4) β2aw = −5.436
(5) f2b / e2bw = 1.168
(6) f2b / e2bt = 0.808
(7) f2a / f2b = 0.957
(8) f2a/ (|f1| + e1t) = 1.192
(9) f2a/ (|f1| + e1w) = 0.845

FIGS. 17(a) through 20(c) are graphs that show various aberrations of the fourth embodiment. FIGS. 17(a)–17(c) are graphs that show various aberrations at the infinite focus state of the maximum wide-angle state. FIGS. 18(a)–18(c) are graphs that show various aberrations at the infinite focus state of the maximum telephoto state. FIGS. 19(a)–19(c) are graphs that show various aberrations at the object distance of R=500 at the maximum wide-angle state. FIGS. 20(a)–12(c) are graphs that show various aberrations at the object distance R=500 at the maximum telephoto state.

In each aberration graph, FNO denotes F-number, NA denotes numerical apertures, Y denotes the image height, d denotes the d-line ($\lambda=587.6$ nm), and g denotes the g-line ($\lambda=435.8$ nm). In the aberration graph showing the astigmatism the solid line represents the sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the fourth embodiment.

Figure 21:
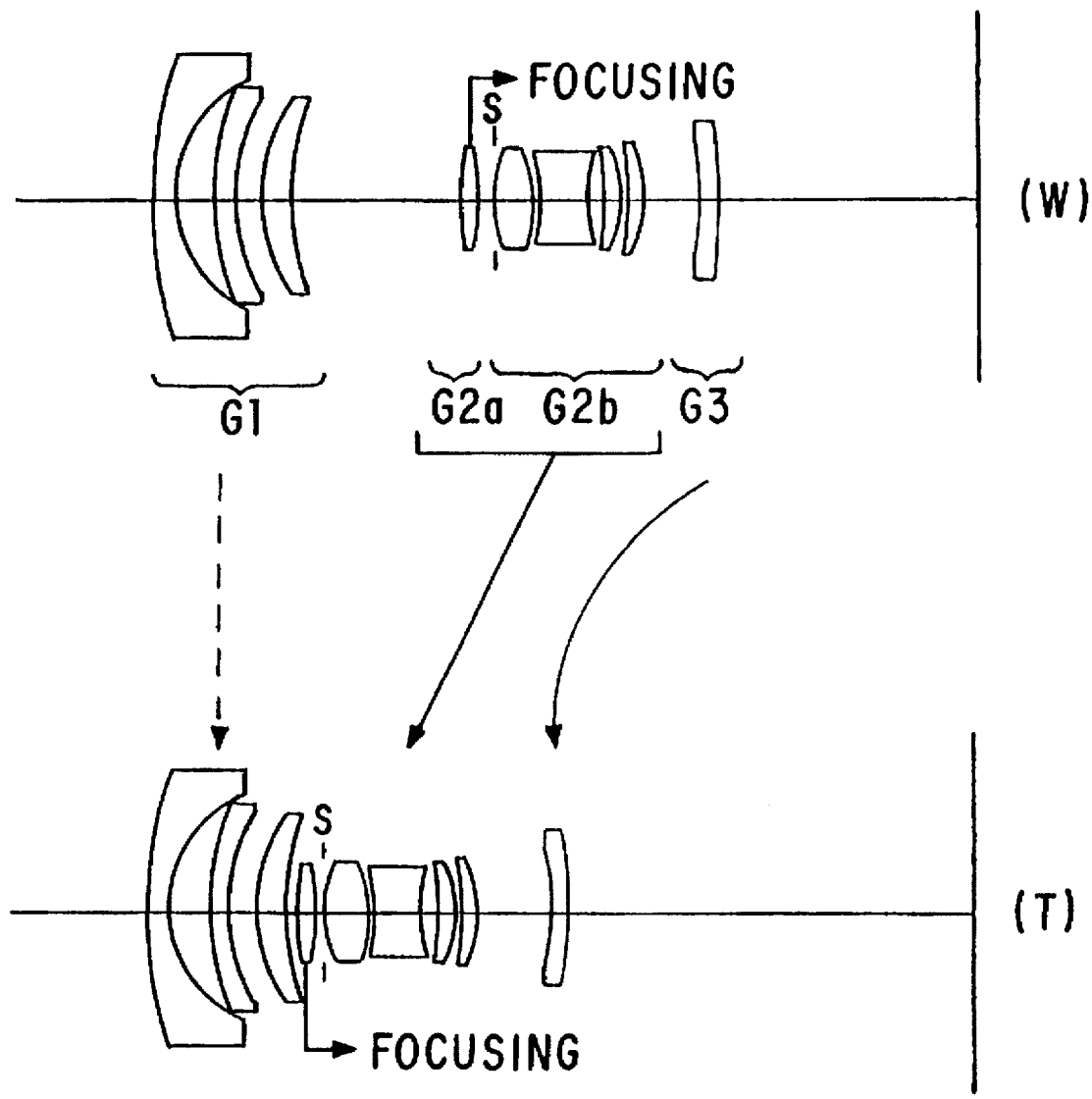
FIG. 21 is a schematic side view of the lens configuration and conditions of movement of each lens group from the maximum wide-angle state (W) to the maximum telephoto state (T) in a zoom lens according to a fifth embodiment of the invention.

FIG. 21 is a schematic side view of the lens structure of the zoom lens and the conditions associated with the movement of each lens group from the maximum wide-angle state (W) to the maximum telephoto state (T) of the fifth embodiment of the invention.

The zoom lens of FIG. 21 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a biconvex lens, a rear group G2b which has a biconvex lens, a biconcave lens, a positive meniscus lens having the concave surface facing the object side and a positive meniscus lens having the concave surface facing the object side, and a third lens group G3 which has a negative meniscus lens having a concave surface facing the object side.

The diaphragm S is arranged between the front group G2a and the rear group G2b. Each lens group moves along the zoom locus on the optical axis indicated by the arrow in FIG. 21 during zooming from the maximum wide-angle state (W) to the maximum telephoto state (T). However, the first lens group G1 is fixed during zooming. Furthermore, focusing from an object at a far distance to an object at a close distance is performed by moving the front group G2a towards the image side.

Next, values of various dimensions in the fifth embodiment of the invention are listed in Table (5). In Table (5), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line ($\lambda=587.6$ nm).

TABLE 5 f = 25.50–35.00–49.00
FNO = 3.99–4.71–5.55
2ω = 82.77–63.86–47.47°

| Surface Number | Radius of Curvature | Intersurface Distance | Abbe Number | Refractive Index |
|----------------|---------------------|-----------------------|-------------|------------------|
| 1   | 73.5448   | 2.6507           | 57.5 | 1.67024        |
| 2*  | 15.0590   | 5.8500           |      |                |
| 3   | 32.6766   | 2.3412           | 45.4 | 1.79668        |
| 4   | 22.8175   | 4.4493           |      |                |
| 5   | 23.5734   | 4.0233           | 25.5 | 1.73037        |
| 6   | 41.2846   | (d6 = variable)  |      |                |
| 7   | 139.6614  | 2.1985           | 82.5 | 1.49782        |
| 8   | −39.4137  | (d8 = variable)  |      |                |
| 9   | ∞         | 0.1000           |      | (diaphragm S)  |
| 10  | 19.7135   | 5.0000           | 45.9 | 1.54813        |
| 11  | −49.1562  | 0.9000           |      |                |
| 12  | −25.9106  | 7.2000           | 31.6 | 1.75692        |
| 13  | 25.5963   | 1.7500           |      |                |
| 14  | −76.4528  | 2.7159           | 67.9 | 1.59318        |
| 15  | −17.1669  | 0.7000           |      |                |
| 16  | −73.1646  | 2.0333           | 67.9 | 1.59318        |
| 17  | −35.6707  | (d17 = variable) |      |                |
| 18  | −48.1373  | 2.0000           | 60.0 | 1.64000        |
| 19  | −65.2859  | Bf               |      |                |

Aspherical Surface Data:

| Surface 2: | κ | $C_2$ | $C_4$ |
| --- | --- | --- | --- |
| | 0.5443 | 0.0000 | $-7.38090 \times 10^{-10}$ |
| | $C_6$ | $C_8$ | $C_{10}$ |
| | $3.59980 \times 10^{-14}$ | $-4.76970 \times 10^{-12}$ | $1.85000 \times 10^{-14}$ |

Variable Distance During Zooming Or Focusing Conditions:

| f   | 25.50    | 35.00    | 49.00    |
|-----|----------|----------|----------|
| R   | ∞        | ∞        | ∞        |
| d6  | 23.00371 | 11.77277 | 0.96377  |
| d8  | 3.08299  | 3.08299  | 3.08299  |
| d17 | 8.94177  | 0.76762  | 12.15414 |
| Bf  | 33.32364 | 52.72873 | 52.15121 |
| f   | 25.50    | 35.00    | 49.00    |
| R   | 500.00   | 500.00   | 500.00   |
| d6  | 25.90764 | 14.58393 | 3.86549  |
| d8  | 0.17906  | 0.27186  | 0.18127  |
| d17 | 8.94177  | 0.76762  | 12.15414 |
| Bf  | 33.32364 | 52.72873 | 52.15121 |

Condition Corresponding Values:

(1) |β2at| = 5.636
(2) |β2aw| = 5.617
(3) β2at = 5.636
(4) β2aw = −5.617
(5) f2b / e2bw = 1.036
(6) f2b / e2bt = 0.722
(7) f2a / f2b = 1.181
(8) f2a/ (|f1| + e1t) = 1.216
(9) f2a/ (|f1| + e1w) = 0.849

FIGS. 22(a) through 25(c) are graphs that show various aberrations of the fifth embodiment. FIGS. 22(a)–22(c) are graphs that show various aberrations at the infinite focus state of the maximum wide-angle state. FIGS. 23(a)–23(c) are graphs that show various aberrations at the infinite focus state of the maximum telephoto state. FIGS. 24(a)–24(c) are graphs that show various aberrations at the object distance of R=500 at the maximum wide-angle state and FIGS. 25(a)–25(c) are graphs that show various aberrations at the object distance R=500 at the maximum telephoto state.

In each aberration graph, FNO denotes F-number, NA denotes numerical apertures, Y denotes the image height, d denotes the d-line (λ=587.6 nm), and g denotes the g-line (λ=435.8 nm). In the aberration graph showing the astigmatism the solid line represents sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the fifth embodiment.

By using the third lens group G3 as a compensator in the invention, the first lens group G1 is fixed during zooming. Hence, fluctuation of the focusing amount of the front group G2a due to zooming is made small, at the same time the total length of the lens system does not change with zooming.

Figure 26:
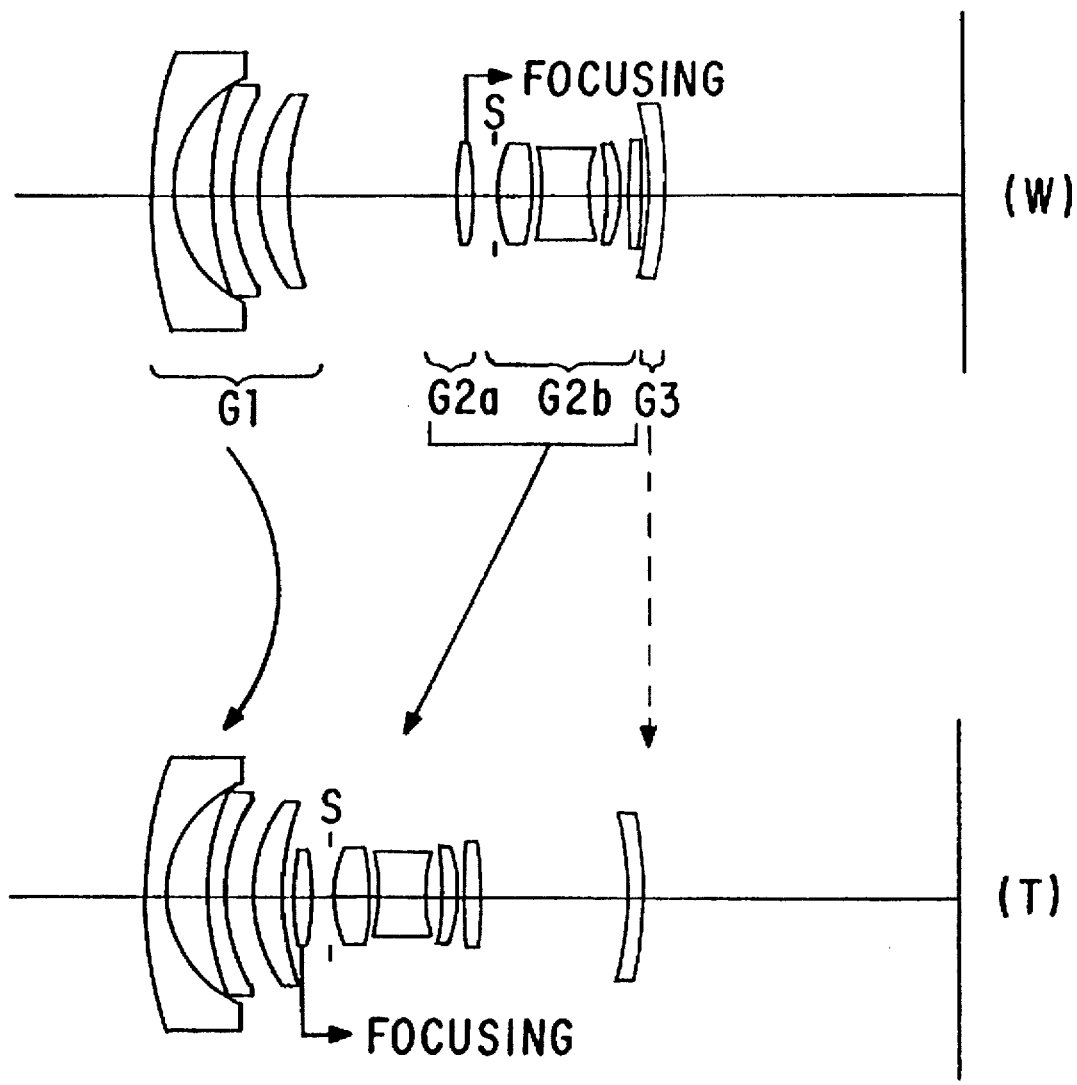
FIG. 26 is a schematic side view of the lens configuration and conditions of movement of each lens group from the maximum wide-angle state (W) to the maximum telephoto state (T) in a zoom lens according to a sixth embodiment of the invention.

FIG. 26 is a schematic side view of the lens structure of the zoom lens and the conditions associated with movement of each lens group from the maximum wide-angle state (W) to the maximum telephoto state (T) of the sixth embodiment of the invention.

The zoom lens of FIG. 26 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a biconvex lens, a rear group G2b which has a biconvex lens, a biconcave lens, a positive meniscus lens having the concave surface facing the object side and a positive meniscus lens having the concave surface facing the object side, and a third lens group G3 which has a negative meniscus lens having a concave surface facing the object side.

The diaphragm S is arranged between the front group G2a and the rear group G2b. Each lens group moves along the zoom locus on the optical axis indicated by the arrow in FIG. 26 during zooming from the maximum wide-angle state (W) to the maximum telephoto state (T). However, the third lens group G3 is fixed during zooming. Furthermore, focusing from an object at a far distance to an object at a close distance is performed by moving the front group G2a towards the image side.

Next, values of various dimensions in the sixth embodiment of the invention are listed in Table (6). In Table (6), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line (λ=587.6 nm).

TABLE 6 f = 25.50–35.00–49.00
FNO = 4.11–4.70–5.59
2ω = 83.01–63.89–47.55°

| Surface Number | Radius of Curvature | Intersurface Distance | Abbe Number | Refractive Index |
| --- | --- | --- | --- | --- |

TABLE 6-continued

| 1 | 64.0409 | 2.6891 | 55.6 | 1.69680 |
| --- | --- | --- | --- | --- |
| 2* | 15.6891 | 5.9348 | | |
| 3 | 41.4498 | 2.3751 | 40.9 | 1.79631 |
| 4 | 23.3644 | 4.5138 | | |
| 5 | 23.7576 | 4.0816 | 25.5 | 1.73037 |
| 6 | 48.8286 | (d6 = variable) | | |
| 7 | 130.1185 | 1.8000 | 82.5 | 1.49782 |
| 8 | −41.9974 | (d8 = variable) | | |
| 9 | ∞ | 0.1000 | | (diaphragm S) |
| 10 | 19.6744 | 5.0000 | 45.9 | 1.54813 |
| 11 | −55.3931 | 0.9429 | | |
| 12 | −26.9934 | 7.5429 | 31.6 | 1.75692 |
| 13 | 25.3973 | 1.8333 | | |
| 14 | −83.9032 | 2.8452 | 67.9 | 1.59318 |
| 15 | −17.8349 | 0.7333 | | |
| 16 | −202.1955 | 2.1302 | 82.5 | 1.49782 |
| 17 | −45.8117 | (d17 = variable) | | |
| 18 | −60.1374 | 2.0000 | 64.1 | 1.51680 |
| 19 | −85.7705 | Bf | | |

Aspherical Surface Data:

Surface 2:
| $\kappa$ | $C_2$ | $C_4$ |
| --- | --- | --- |
| 0.5830 | 0.0000 | $-7.38090 \times 10^{-10}$ |
| $C_6$ | $C_8$ | $C_{10}$ |
| $3.59980 \times 10^{-14}$ | $-4.76970 \times 10^{-12}$ | $1.85000 \times 10^{-14}$ |

Variable Distance During Zooming Or Focusing Conditions:

| f | 25.50 | 35.00 | 49.00 |
| --- | --- | --- | --- |
| R | ∞ | ∞ | ∞ |
| d6 | 25.18780 | 11.34141 | 0.72238 |
| d8 | 3.20606 | 3.20606 | 3.20606 |
| d17 | 0.75170 | 8.80504 | 20.67313 |
| Bf | 43.15633 | 43.15633 | 43.15633 |
| f | 25.50 | 35.00 | 49.00 |
| R | 500.00 | 500.00 | 500.00 |
| d6 | 28.22560 | 14.22631 | 3.72037 |
| d8 | 0.16827 | 0.32116 | 0.20807 |
| d17 | 0.75170 | 8.80504 | 20.67313 |
| Bf | 45.15633 | 45.15633 | 45.15633 |

Condition Corresponding Values:

(1) |β2at| = 5.292
(2) |β2aw| = 5.173
(3) β2at = 5.292
(4) β2aw = −5.173
(5) f2b / e2bw = 1.035
(6) f2b / e2bt = 0.753
(7) f2a / f2b = 1.164
(8) f2a/ (|f1| + e1t) = 1.233
(9) f2a/ (|f1| + e1w) = 0.838

FIGS. 27(a) through 30(c) are graphs that show various aberrations of the sixth embodiment. FIGS. 27(a)–27(c) are graphs that show various aberrations at infinite focus state of the maximum wide-angle state. FIGS. 28(a)–28(c) are graphs that show various aberrations at infinite focus state of the maximum telephoto state. FIGS. 29(a)–29(c) are graphs that show various aberrations at the object distance of R=500 at maximum wide-angle state. FIGS. 30(a)–30(c) are graphs that show various aberrations at the object distance R=500 at the maximum telephoto state.

In each aberration graph, FNO denotes F-number, NA denotes numerical apertures, Y denotes the image height, d denotes the d-line (λ=587.6 nm), and g denotes the g-line (λ=435.8 nm). In the aberration graph showing the astigmatism the solid line represents the sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the sixth embodiment.

Figure 31:
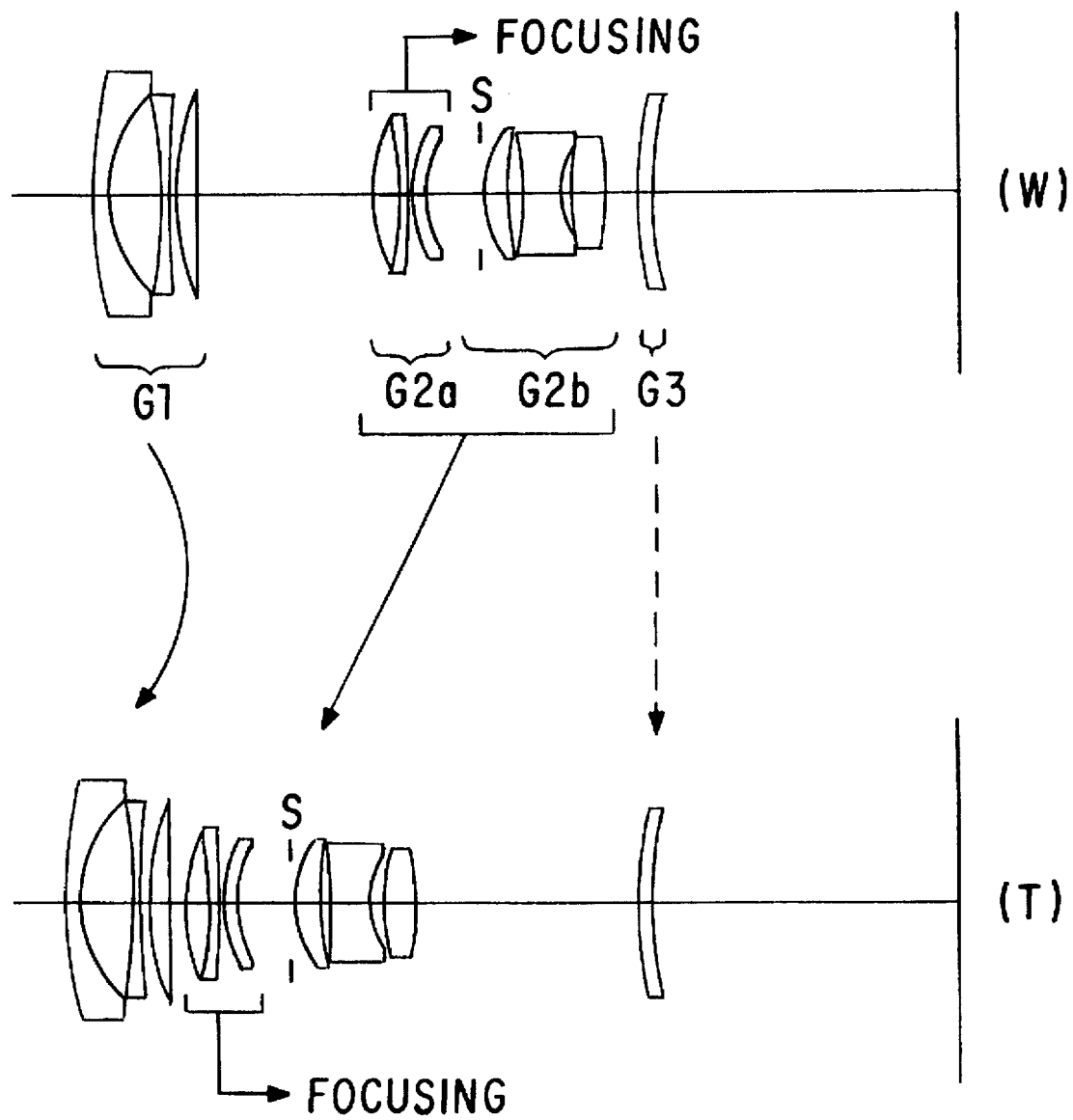
FIG. 31 is a schematic side view of the lens configuration and conditions of movement of each lens group from the maximum wide-angle state (W) to the maximum telephoto state (T) in a zoom lens according to a seventh embodiment of the invention.

FIG. 31 is a schematic side view of the lens structure of the zoom lens and the conditions associated with the movement of each lens group from the maximum wide-angle state (W) to the maximum telephoto state (T) of the seventh embodiment of the invention.

The zoom lens of FIG. 31 comprises, in order from the object side, a first lens group G1 which has a negative meniscus lens having a convex surface facing the object side, a biconcave lens and a positive meniscus lens having a convex surface facing the object side, a front group G2a which has a cemented positive lens with a biconvex lens and a negative meniscus lens having a concave surface facing the object side, a rear group G2b which has a positive meniscus lens with a convex surface facing the object side, a biconcave lens and a biconvex lens, and a third lens group G3 which has a negative meniscus lens having a convex surface facing the object side.

The diaphragm S is arranged between the front group G2a and the rear group G2b. Each lens group moves along the zoom locus on the optical axis indicated by the arrow in FIG. 31 during zooming from the maximum wide-angle state (W) to the maximum telephoto state (T). However, the third lens group G3 is fixed during zooming. Furthermore, focusing from an object at a far distance to an object at a close distance is performed by moving the front group G2a towards the image side.

Next, values of various dimensions in the seventh embodiment of the invention are listed in Table (7). In Table (7), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line ($\lambda$=587.6 nm).

TABLE 7 f = 41.00~56.00~78.00
FNO = 3.50~4.37~5.55
2ω = 65.03~47.41~35.28°

| Surface Number | Radius of Curvature | Intersurface Distance | Abbe Number | Refractive Index |
|---|---|---|---|---|
| 1 | 68.8469 | 1.6000 | 50.8 | 1.65844 |
| 2 | 18.6778 | 8.3000 | | |
| 3 | −68.8979 | 1.1000 | 55.6 | 1.69680 |
| 4 | 129.2316 | 0.5000 | | |
| 5 | 35.5473 | 3.3000 | 30.0 | 1.69895 |
| 6 | 417.8897 | (d6 = variable) | | |
| 7 | 24.5488 | 3.8000 | 57.0 | 1.62280 |
| 8 | −39.0000 | 1.0000 | 37.9 | 1.72342 |
| 9 | −298.9188 | 1.0000 | | |
| 10 | 19.9715 | 1.0000 | 27.6 | 1.75520 |
| 11 | 14.7779 | (d11 = variable) | | |
| 12 | ∞ | 0.5000 | | (diaphragm S) |
| 13 | 15.6193 | 4.0000 | 45.9 | 1.54813 |
| 14 | 117.4072 | 1.0000 | | |
| 15 | −127.1742 | 6.0000 | 35.2 | 1.74950 |
| 16 | 16.0323 | 1.5000 | | |
| 17 | 30.3911 | 4.5000 | 47.1 | 1.67003 |
| 18 | −68.1296 | (d18 = variable) | | |
| 19 | 76.4014 | 1.5000 | 60.0 | 1.64000 |
| 20 | 54.2347 | Bf | | |

Variable Distance During Zooming Or Focusing Conditions:

| f | 41.00 | 56.00 | 78.00 |
|---|---|---|---|
| R | ∞ | ∞ | ∞ |
| d6 | 25.33128 | 12.15658 | 1.99968 |
| d11 | 8.69867 | 8.69867 | 8.69867 |
| d18 | 4.99987 | 15.99237 | 32.11467 |

TABLE 7-continued

| Bf | 44.41298 | 44.41298 | 44.41298 |
|---|---|---|---|
| f | 41.00 | 55.00 | 78.00 |
| R | 500.00 | 500.00 | 500.00 |
| d6 | 30.52992 | 17.14968 | 7.20032 |
| d11 | 3.50004 | 3.70557 | 3.49803 |
| d18 | 4.99987 | 15.99237 | 32.11467 |
| Bf | 44.41298 | 44.41298 | 44.41298 |

Condition Corresponding Values:

(1) |β2atl| = 6.124
(2) |β2awl| = 5.407
(3) β2at = 6.124
(4) β2aw = −5.407
(5) f2b / e2bw = 1.076
(6) f2b / e2bt = 0.759
(7) f2a / f2b = 0.957
(8) f2a/ (|f1| + e1t) = 1.195
(9) f2a/ (|f1| + e1w) = 0.844

Figure 32A:
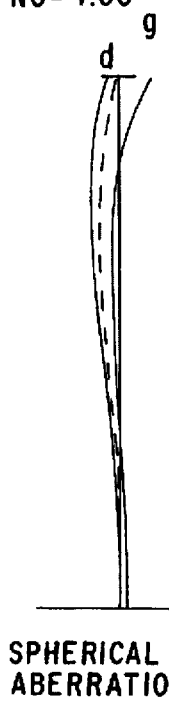
FIGS. 32(a)–32(c) are graphs that show various aberrations in the infinite distance focus state at the maximum wide-angle state in the seventh embodiment.
Figure 32B:
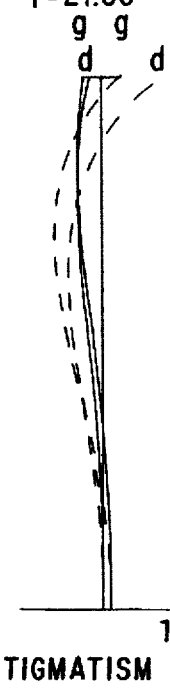
Figure 32C:
Figure 33A:
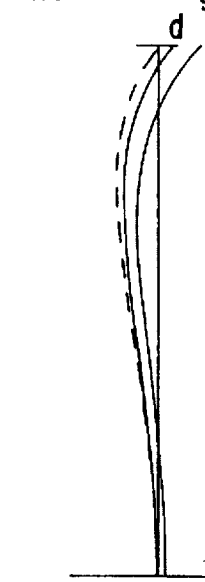
FIGS. 33(a)–33(c) are graphs that show various aberrations in the infinite distance focus state at maximum telephoto state in the seventh embodiment.
Figure 33B:
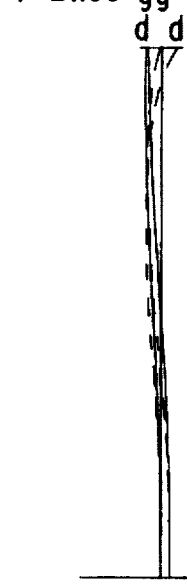
Figure 33C:
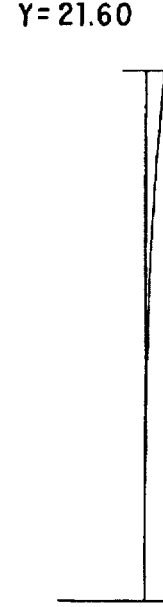

FIGS. 32(a) through 35(c) are graphs that show various aberrations of the seventh embodiment. FIGS. 32(a)–32(c) are graphs that show various aberrations at the infinite focus state of the maximum wide-angle state. FIGS. 33(a)–33(c) are graphs that show various aberrations at the infinite focus state of the maximum telephoto state. FIGS. 34(a)–34(c) are graphs that show various aberrations at the object distance of R=500 at maximum wide-angle state. FIGS. 35(a)–35(c) are graphs that shows various aberrations at the object distance R=500 at the maximum telephoto state.

In each aberration graph, FNO denotes F-number, NA denotes numerical apertures, Y denotes the image height, d denotes the d-line ($\lambda$=587.6 nm), and g denotes the g-line ($\lambda$=435.8 nm). In the aberration graph showing the astigmatism the solid line represents sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the seventh embodiment.

Figure 36:
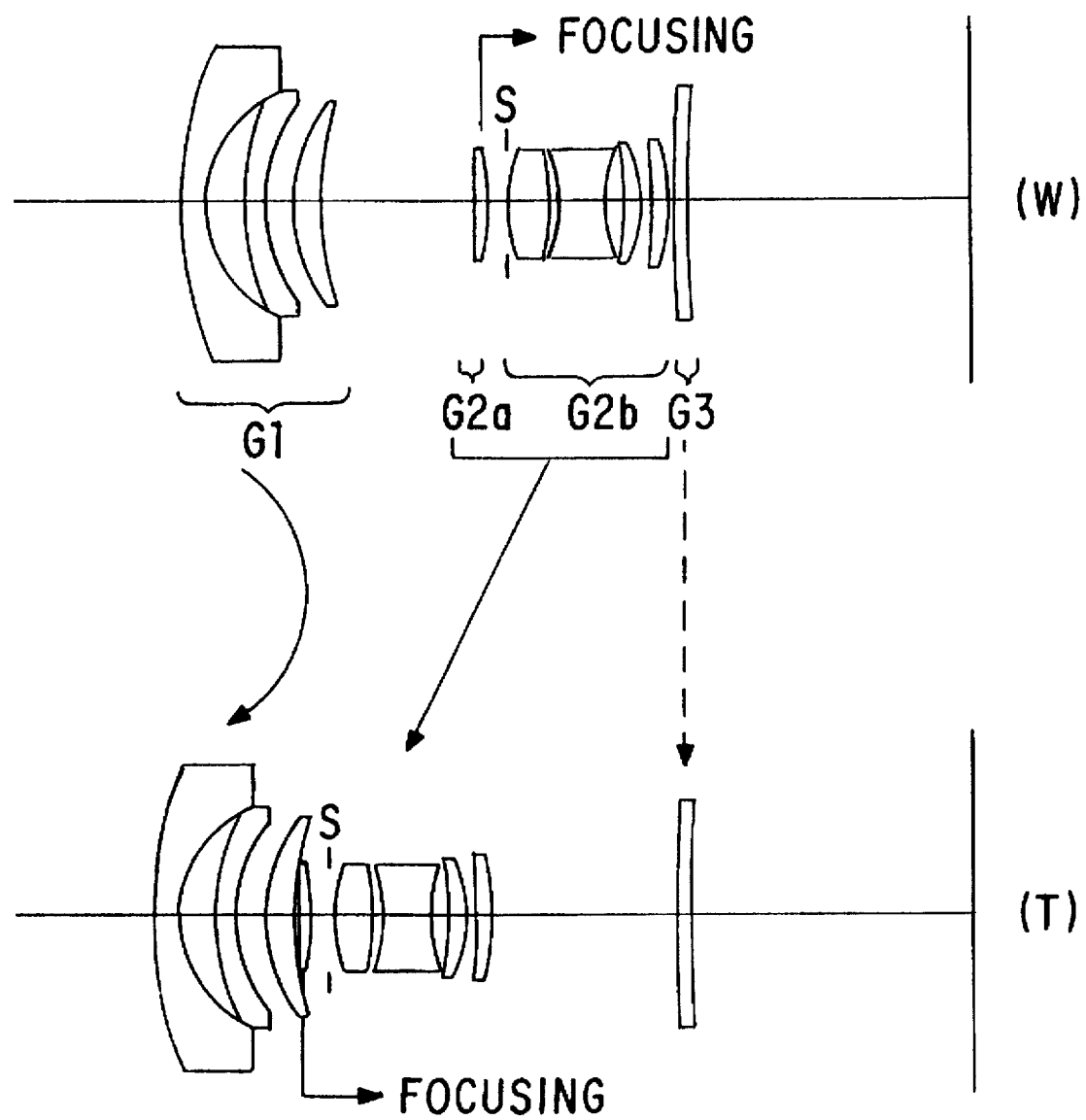
FIG. 36 is a schematic side view of the lens configuration and conditions of movement of each lens group from the maximum wide-angle state (W) to the maximum telephoto state (T) in a zoom lens according to an eighth embodiment of the invention.

FIG. 36 is a schematic side view of the lens structure of the zoom lens and the conditions associated with the movement of each lens group from the maximum wide-angle state (W) to the maximum telephoto state (T) of the eighth embodiment of the invention.

The zoom lens of FIG. 36 comprises, in order from the object side, a first lens group G1 which has a negative meniscus lens having a convex surface facing the object side, a negative meniscus lens having a convex surface facing the object side and a positive meniscus lens having a convex surface facing the object side, a front group G2a which has a biconvex lens, a rear group G2b which has a biconvex lens, a biconcave lens, a positive meniscus lens with a concave surface facing the object side and a positive meniscus lens with a concave surface facing the object side, and a third lens group G3 which has a positive meniscus lens having a convex surface facing the object side.

The diaphragm S is arranged between the front group G2a and the rear group G2b. Each lens group moves along the zoom locus on the optical axis indicated by the arrow in FIG. 36 during zooming from the maximum wide-angle state (W) to the maximum telephoto state (T). However, the third lens group G3 is fixed during zooming. Furthermore, focusing from an object at a far distance to an object at a close distance is performed by moving the front group G2a towards the image side.

Next, values of various dimensions in the eighth embodiment of the invention are listed in Table (8). In Table (8), f denotes the focal length, FNO denotes F-number, 2ω denotes field angle, R denotes the object distance, and Bf denotes the back focus. The surface number is the order of the lens surface from the object side along the direction of the advancement of the light ray, and the values of refraction index and the Abbe number are relative to the d-line (λ=587.6 nm).

TABLE 8 f = 25.50–35.00–49.00
FNO = 3.56–4.13–4.99
2ω = 82.77–63.83–47.59°

| Surface Number | Radius of Curvature | Intersurface Distance | Abbe Number | Refractive Index |
|---|---|---|---|---|
| 1 | 65.5830 | 3.0000 | 58.5 | 1.61272 |
| 2* | 14.7276 | 5.9347 | | |
| 3 | 34.3336 | 2.3751 | 45.4 | 1.79668 |
| 4 | 21.7024 | 4.5000 | | |
| 5 | 22.1499 | 4.0000 | 25.5 | 1.73037 |
| 6 | 37.9191 | (d6 = variable) | | |
| 7 | 111.6346 | 1.6000 | 82.5 | 1.49782 |
| 8 | –41.5154 | (d8 = variable) | | |
| 9 | ∞ | 0.1000 | | (diaphragm S) |
| 10 | 22.2730 | 0.1000 | 47.0 | 1.56013 |
| 11 | –58.8093 | 5.0000 | | |
| 12 | –28.2525 | 0.9428 | 31.1 | 1.68893 |
| 13 | 26.0002 | 7.5428 | | |
| 14 | –59.9522 | 1.8333 | 67.9 | 1.59318 |
| 15 | –18.8095 | 2.8452 | | |
| 16 | –111.5881 | 1.5000 | 82.5 | 1.49782 |
| 17 | –43.4325 | (d17 = variable) | | |
| 18 | 222.5824 | 2.0000 | 64.1 | 1.51680 |
| 19 | 1600.8694 | Bf | | |

Aspherical Surface Data:

| Surface 2: | κ | $C_2$ | $C_4$ |
|---|---|---|---|
| | 0.5830 | 0.0000 | $-7.38090 \times 10^{-10}$ |
| | $C_6$ | $C_8$ | $C_{10}$ |
| | $3.59980 \times 10^{-14}$ | $-4.76970 \times 10^{-12}$ | $1.85000 \times 10^{-14}$ |

Variable Distance During Zooming Or Focusing Conditions:

| f | 25.50 | 35.00 | 49.00 |
|---|---|---|---|
| R | ∞ | ∞ | ∞ |
| d6 | 22.06006 | 10.16080 | 1.03502 |
| d8 | 3.47634 | 3.47634 | 3.47634 |
| d17 | 0.76684 | 11.09205 | 26.30822 |
| Bf | 40.30980 | 40.30980 | 40.30980 |
| f | 25.50 | 35.00 | 49.00 |
| R | 500.00 | 500.00 | 500.00 |
| d6 | 25.03209 | 13.03268 | 4.03378 |
| d8 | 0.50431 | 0.60446 | 0.47758 |
| d17 | 4.99987 | 15.99237 | 32.11467 |
| Bf | 40.30980 | 40.30980 | 40.30980 |

Condition Corresponding Values:

(1) |β2at| = 5.746
(2) |β2aw| = 5.860
(3) β2at = 5.746
(4) β2aw = –5.860
(5) f2b / e2bw = 1.247
(6) f2b / e2bt = 0.833
(7) f2a / f2b = 0.953
(8) f2a/ (|f1| + e1t) = 1.206
(9) f2a/ (|f1| + e1w) = 0.852

FIGS. 37(a) through 40(c) are graphs that show various aberrations of the eighth embodiment. FIGS. 37(a)–37(c) are graphs that show various aberrations at the infinite focus state of the maximum wide-angle state. FIGS. 38(a)–38(c) are graphs that show various aberrations at infinite focus state of the maximum telephoto state. FIGS. 39(a)–39(b) are graphs that show various aberrations at the object distance of R=500 at the maximum wide-angle state. FIGS. 40(a)–40(c) are graphs that show various aberrations at the object distance R=500 at the maximum telephoto state.

In each aberration graph, FNO denotes F-number, NA denotes the numerical apertures, Y denotes the image height, d denotes the d-line (λ=587.6 nm), and g denotes the g-line (λ=435.8 nm). In the aberration graph showing the astigmatism the solid line represents the sagittal image plane and the broken line represents the meridional image plane. Furthermore, in the aberration graph showing spherical aberration, the broken line represents the sine condition of the d-line. Each aberration graph clearly indicates that various aberrations are favorably corrected at each focal length condition as well as at each object distance condition in the eighth embodiment.

By moving one of the lens groups in the direction substantially perpendicular to the optical axis in the invention, fluctuation of the image position caused by the vibration of the optical system due to a shaking hand and the like may be corrected. Here, as the anti-vibration, or image stabilizing correction lens group which moves substantially perpendicular to the optical axis, the front group G2a or the rear group G2b which has relatively small size may preferably be selected to miniaturize the driving mechanism.

As described above, the amount of movement of the focusing lens group required for focusing on objects at the same distance may be kept substantially constant regardless of the zoom position in the invention, even if an inner focusing method is implemented. As the result, both increasing of the speed of lens drive during auto focusing and improvement on operability during manual focusing become possible.

While the invention had been described in conjunction with preferred embodiments thereof, it is evident that many alternatives, modifications and variations may be apparent to those skilled in the art. Accordingly, it is intended to embrace all alternatives, modifications and variations which may fall within the spirit and broad scope of the appended claims.

What is claimed is:

1. A zoom lens consisting of, in order from an object side:
a first lens group which has a negative refractive power; and a second lens group which has a positive refractive power, wherein zooming is executed by changing a distance between the first lens group and the second lens group, wherein the second lens group comprises, in order from the object side, a front group which has a positive refractive power and a rear group which has a positive refractive power, and wherein focusing from an object at a far distance to an object at a close distance is executed by moving the front group towards an image side.

2. The zoom lens of claim 1, wherein conditions

|β2at|>2

|β2aw|>2 are satisfied where β2at is an imaging magnification of the front group at a maximum telephoto state and β2aw is an imaging magnification of the front group at a maximum wide-angle state.

3. The zoom lens of claim 1, wherein conditions

β2at>2

β2aw<–2 are satisfied where β2at is an imaging magnification of the front group at a maximum telephoto state and β2aw is an imaging magnification of the front group at a maximum wide-angle state.

4. The zoom lens of claim 1, wherein conditions f2b/e2bw>0.8 f2b/e2bt<1.2 are satisfied where f2b is a focal length of the rear group, e2bw is a distance from an image principal point of the rear group to an image plane at a maximum wide-angle state, and e2bt is a distance from an image principal point of the rear group to an image plane at a maximum telephoto state.

5. The zoom lens of claim 1, wherein condition 0.5<f2a/f2b<2 is satisfied where f2a is a focal length of the front group and f2b is a focal length of the rear group.

6. The zoom lens of claim 1, wherein conditions f2a/(lf1l+e1t)>0.8 f2a/(lf1l+e1w)<1.2 are satisfied where f2a is a focal length of the front group, f1 is a focal length of the first lens group, e1w is a distance from an image principal point of the first lens group to an object principal point of the front group at a maximum wide-angle state, and e1t is a distance from the image principal point of the first lens group to an object principal point of the front group at a maximum telephoto state.

7. The zoom lens of claim 1, wherein a diaphragm is provided between the front group and the rear group.

8. The zoom lens of claim 1, wherein the front group consists of one biconvex lens.

9. A zoom lens consisting of in order from an object side:

a first lens group which has a negative refractive power;

a second lens group which has a positive refractive power; and a third lens group which has a negative refractive power, wherein a distance between the first lens group and the second lens group decreases, and a distance between the second lens group and the third lens group changes during zooming from a maximum wide-angle state to a maximum telephoto state, wherein the second lens group comprises, in order from the object side, a front group which has a positive refractive power and a rear group which has a positive refractive power, and wherein focusing from an object at a far distance to an object at a close distance is executed by moving the front group towards an image side, wherein conditions lβ2atl>2 lβ2awl>2 are satisfied where β2at is an imaging magnification of the front group at a maximum telephoto state and β2aw is an imaging magnification of the front group at a maximum wide-angle state.

10. A zoom lens consisting of in order from an object side:

a first lens group which has a negative refractive power;

a second lens group which has a positive refractive power; and a third lens group which has a negative refractive power, wherein a distance between the first lens group and the second lens group decreases, and a distance between the second lens group and the third lens group changes during zooming from a maximum wide-angle state to a maximum telephoto state, wherein the second lens group comprises, in order from the object side, a front group which has a positive refractive power and a rear group which has a positive refractive power, and wherein focusing from an object at a far distance to an object at a close distance is executed by moving the front group towards an image side, wherein conditions β2at>2

β2aw<−2 are satisfied where β2at is an imaging magnification of the front group at a maximum telephoto state and β2aw is an imaging magnification of the front group at a maximum wide-angle state.

11. A zoom lens consisting of in order from an object side:

a first lens group which has a negative refractive power;

a second lens group which has a positive refractive power; and a third lens group which has a negative refractive power, wherein a distance between the first lens group and the second lens group decreases, and a distance between the second lens group and the third lens group changes during zooming from a maximum wide-angle state to a maximum telephoto state, wherein the second lens group comprises, in order from the object side, a front group which has a positive refractive power and a rear group which has a positive refractive power, and wherein focusing from an object at a far distance to an object at a close distance is executed by moving the front group towards an image side, wherein conditions f2b/e2bw>0.8 f2b/e2bt<1.2 are satisfied where f2b is a focal length of the rear group, e2bw is a distance from an image principal point of the rear group to an image plane at a maximum wide-angle state, and e2bt is a distance from an image principal point of the rear group to an image plane at a maximum telephoto state.

12. A zoom lens consisting of in order from an object side:

a first lens group which has a negative refractive power;

a second lens group which has a positive refractive power; and a third lens group which has a negative refractive power, wherein a distance between the first lens group and the second lens group decreases, and a distance between the second lens group and the third lens group changes during zooming from a maximum wide-angle state to a maximum telephoto state, wherein the second lens group comprises, in order from the object side, a front group which has a positive refractive power and a rear group which has a positive refractive power, and wherein focusing from an object at a far distance to an object at a close distance is executed by moving the front group towards an image side, wherein conditions f2a/(lf1l+e1t)>0.8 f2a/(lf1l+e1w)<1.2 are satisfied where f2a is a focal length of the front group, f1 is a focal length of the first lens group, e1w is a distance from an image principal point of the first lens group to an object principal point of the front group at a maximum wide-angle state, and e1t is a distance from the image principal point of the first lens group to an object principal point of the front group at a maximum telephoto state.

13. A zoom lens consisting of in order from an object side:

a first lens group which has a negative refractive power;

a second lens group which has a positive refractive power; and a third lens group which has a negative refractive power, wherein a distance between the first lens group and the second lens group decreases, and a distance between the second lens group and the third lens group changes during zooming from a maximum wide-angle state to a maximum telephoto state, wherein the second lens rouses, in order from the object side, a front which has a positive refractive power and a rear which has a positive refractive power, and wherein focusing from an object at a far distance to an object at a close distance is executed by moving the front group towards an image side, wherein the first lens group remains still during zooming.

14. A zoom lens comprising, in order from an object side:

a first lens which has a negative refractive power;

a second lens group which has a positive refractive power; and a third lens group which has a positive refractive power, wherein a distance between the first lens and the second lens group decreases, and a distance between the second lens group and the third lens group changes during zooming from a maximum wide-angle state to a maximum telephoto state, wherein the second lens group comprises, in order from an object side, a front group which has a positive refractive power and a rear group which has a positive refractive power, and wherein focusing from an object at a far distance to an object at a close distance is executed by moving the front group towards an image side, wherein conditions $|\beta 2at| > 2$
$|\beta 2aw| > 2$ are satisfied where $\beta 2at$ is an imaging magnification of the front group at a maximum telephoto state and $\beta 2aw$ is an imaging magnification of the front group at a maximum wide-angle state.

15. A zoom lens comprising, in order from an object side:

a first lens group which has a negative refractive power;

a second lens group which has a positive refractive power; and a third lens group which has a positive refractive power, wherein a distance between the first lens group and the second lens group decreases, and a distance between the second lens group and the third lens group changes during zooming from a maximum wide-angle state to a maximum telephoto state, wherein the second lens group comprises, in order from an object side, a front group which has a positive refractive power and a rear group which has a positive refractive power, and wherein focusing from an object at a far distance to an object at a close distance is executed by moving the front group towards an image side, wherein conditions $\beta 2at > 2$
$\beta 2aw < -2$ are satisfied where $\beta 2at$ is an imaging magnification of the front group at a maximum telephoto state and $\beta 2aw$ is an imaging magnification of the front group at a maximum wide-angle state.

16. A zoom lens comprising, in order from an object side:

a first lens group which has a negative refractive power;

a second lens which has a positive refractive power; and a third lens group which has a positive refractive power, wherein a distance between the first lens and the second lens group decreases, and a distance between the second lens group and the third lens group changes during zooming from a maximum wide-angle state to a maximum telephoto state, wherein the second lens group comprises, in order from an object side, a front which has a positive refractive power and a rear group which has a positive refractive power, and wherein focusing from an object at a far distance to an object at a close distance is executed by moving the front group towards an image side, wherein conditions $f2b/e2bw > 0.8$
$f2b/e2bt < 1.2$ are satisfied where f2b is a focal length of the rear group, e2bw is a distance from an image principal point of the rear group to an image plane at a maximum wide-angle state, and e2bt is a distance from an image principal point of the rear group to an image plane at a maximum telephoto state.

17. A zoom lens comprising, in order from an object side:

a first lens group which has a negative refractive power;

a second lens group which has a positive refractive power; and a third lens group which has a positive refractive power, wherein a distance between the first lens group and the second lens group decreases, and a distance between the second lens group and the third lens group changes during zooming from a maximum wide-angle state to a maximum telephoto state, wherein the second lens group comprises, in order from an object side, a front group which has a positive refractive power and a rear group which has a positive refractive power, and wherein focusing from an object at a far distance to an object at a close distance is executed by moving the front group towards an image side, wherein conditions $f2a/(|f1|+e1t) > 0.8$
$f2a/(|f1|+e1w) < 1.2$ are satisfied where f2a is a focal length of the front group, f1 is a focal length of the first lens group, e1w is a distance from an image principal point of the first lens group to an object principal point of the front group at a maximum wide-angle state, and e1t is a distance from the image principal point of the first lens group to an object principal point of the front group at a maximum telephoto state.

18. A method of structuring a zoom lens comprising the steps of:

providing, in order from an object side, a first lens group which has a negative refractive power and a second lens group which has a positive refractive power, wherein zooming is executed by changing a distance between the first lens group and the second lens group, wherein the second lens group comprises, in order from the object side, a front group which has a positive refractive power and a rear group which has a positive refractive power, and wherein focusing from an object at a far distance to an object at a close distance is executed by moving the front group towards an image side.

* * * * *